(12) United States Patent
Jung et al.

(10) Patent No.: US 10,042,596 B2
(45) Date of Patent: Aug. 7, 2018

(54) ELECTRONIC DEVICE AND METHOD FOR CONTROLLING THE SAME

(71) Applicant: LG ELECTRONICS INC., Seoul (KR)

(72) Inventors: Jaehun Jung, Seoul (KR); Kyeongtae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 480 days.

(21) Appl. No.: 14/442,638

(22) PCT Filed: Oct. 20, 2014

(86) PCT No.: PCT/KR2014/009818
§ 371 (c)(1),
(2) Date: May 13, 2015

(87) PCT Pub. No.: WO2015/122590
PCT Pub. Date: Aug. 20, 2015

(65) Prior Publication Data
US 2016/0283181 A1 Sep. 29, 2016

(30) Foreign Application Priority Data
Feb. 11, 2014 (KR) .................. 10-2014-0015755

(51) Int. Cl.
*G06F 3/00* (2006.01)
*G06F 3/14* (2006.01)
(Continued)

(52) U.S. Cl.
CPC .......... *G06F 3/1423* (2013.01); *G06F 1/1647* (2013.01); *G06F 3/0484* (2013.01);
(Continued)

(58) Field of Classification Search
CPC .. G06F 3/0481; G06F 3/1423; G06F 3/04883; G06F 3/04886; G06F 3/0484
See application file for complete search history.

(56) References Cited

U.S. PATENT DOCUMENTS 9,158,333 B1 * 10/2015 Froment ............... G06F 1/1615
9,696,958 B2 * 7/2017 Choi ..................... G06F 3/1446
(Continued)

FOREIGN PATENT DOCUMENTS

| CN | 102855114 A | 1/2013 |
| CN | 103324419 A | 9/2013 |
| KR | 10-0837545 B1 | 6/2008 |

OTHER PUBLICATIONS

Ohta et al., "Pinch: An Interface That Regulates Applications on MultipleTouch-Screen by "Pincing" Gesture," ACE, XP047020310, 2012, pp. 320-335.

*Primary Examiner* — Haoshian Shih
(74) *Attorney, Agent, or Firm* — Birch, Stewart, Kolasch & Birch, LLP

(57) ABSTRACT

Disclosed herein are an electronic device and a method of controlling the same. The electronic device may include a controller configured to generate a group of a plurality of electronic devices by paring the electronic device with at least one electronic device through the communication unit and to control the plurality of electronic devices included in the group to share at least part of content and to simultaneously display the content on touchscreens of the plurality of electronic devices. Upon sequential reception of touch inputs applied to the touchscreens of the electronic devices included in the group, the controller can display at least part of the content on the touchscreen of each electronic device included in the group on the basis of the number of touch inputs and touch input reception time.

18 Claims, 29 Drawing Sheets

(51) Int. Cl.
*G06F 1/16* (2006.01)
*G06F 3/0484* (2013.01)
*G06F 3/0488* (2013.01)

(52) U.S. Cl.
CPC ...... *G06F 3/04883* (2013.01); *G06F 3/04886* (2013.01); *G06F 3/1446* (2013.01); *G09G 2356/00* (2013.01)

(56) References Cited

U.S. PATENT DOCUMENTS

| | | |
|---|---|---|
| 2009/0237325 A1 | 9/2009 | Luo et al. |
| 2010/0144283 A1 | 6/2010 | Curcio et al. |
| 2011/0090155 A1 | 4/2011 | Caskey et al. |
| 2011/0209100 A1 | 8/2011 | Hinckley et al. |
| 2012/0229399 A1* | 9/2012 | Kobayashi ............ G06F 3/0486 345/173 |
| 2012/0280898 A1 | 11/2012 | Lucero et al. |
| 2013/0021262 A1 | 1/2013 | Chen |
| 2013/0241954 A1* | 9/2013 | Yu ........................ G06F 3/1446 345/629 |
| 2014/0289635 A1* | 9/2014 | Honda .................. G06F 3/1204 715/735 |

\* cited by examiner

[Fig. 1]
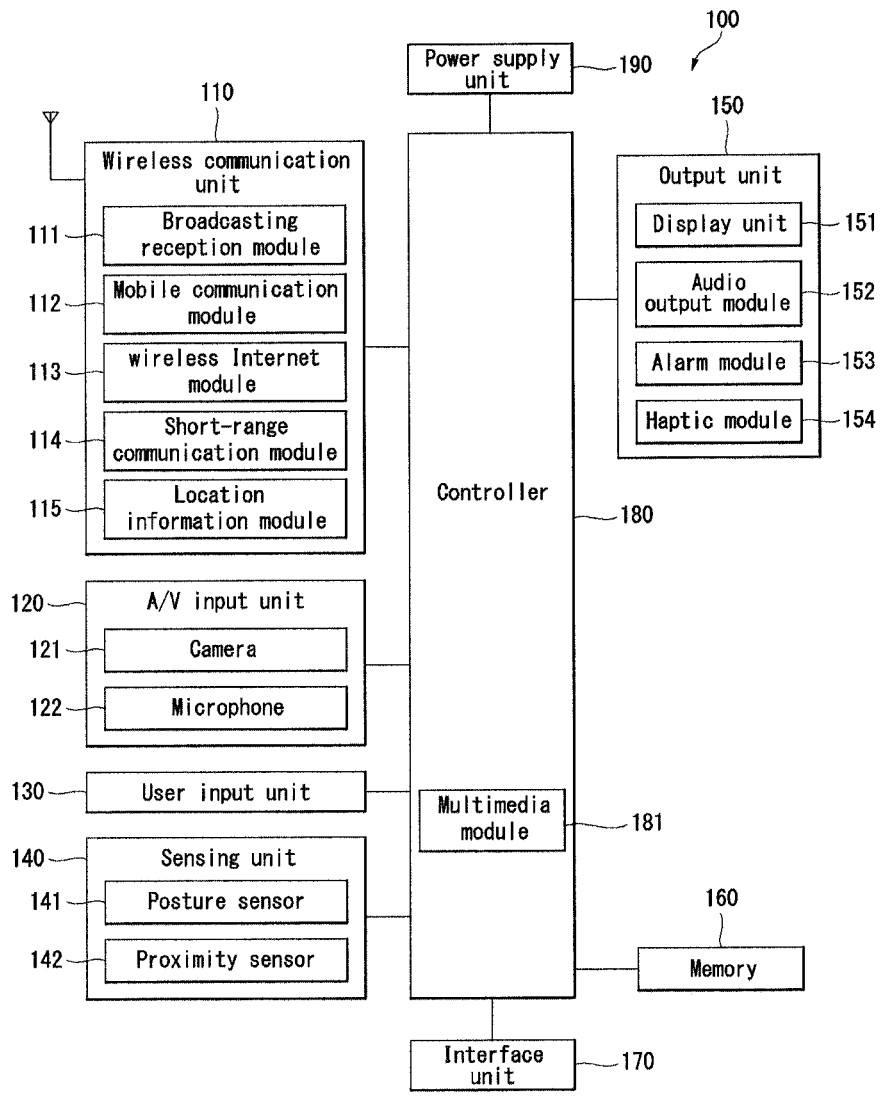
[Fig. 2a]
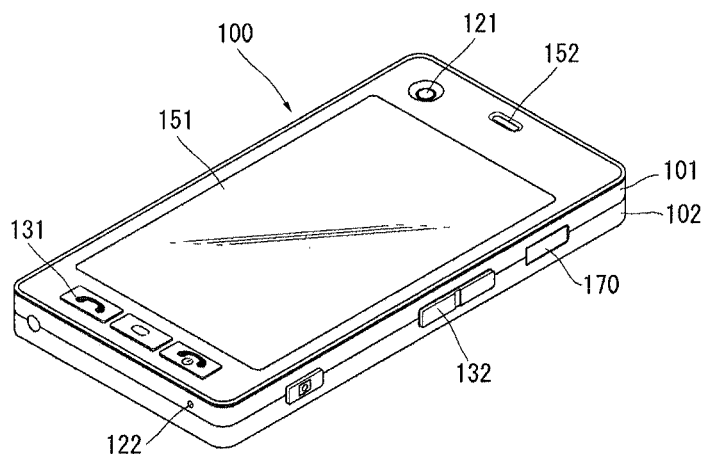

[Fig. 2b]
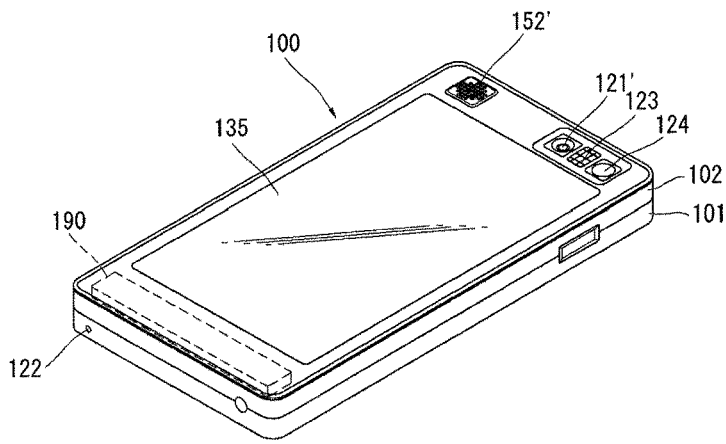
[Fig. 3]
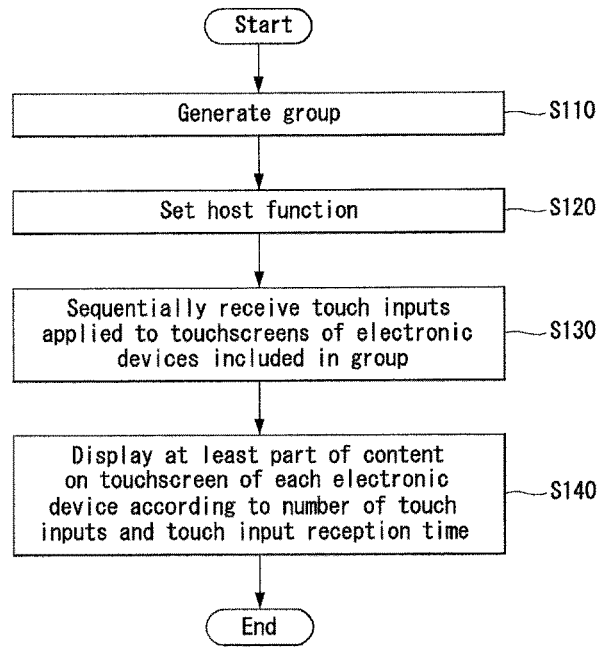
[Fig. 4]
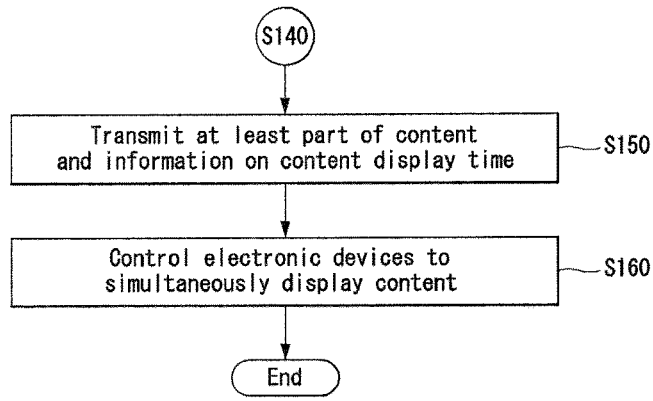

[Fig. 5]
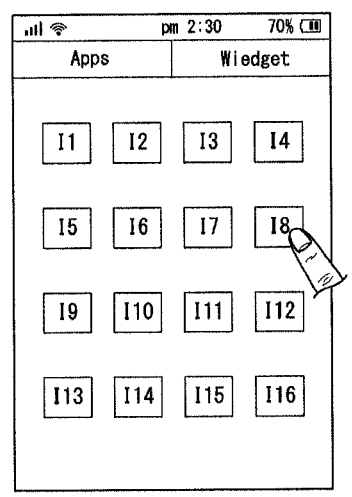
[Fig. 6]
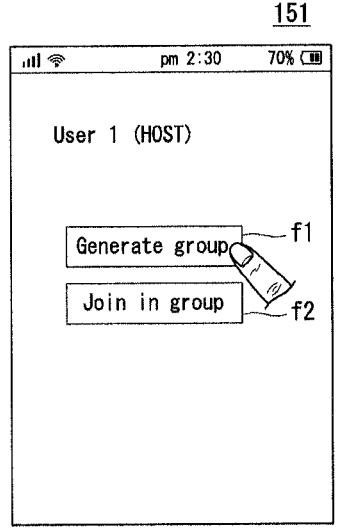
(a)
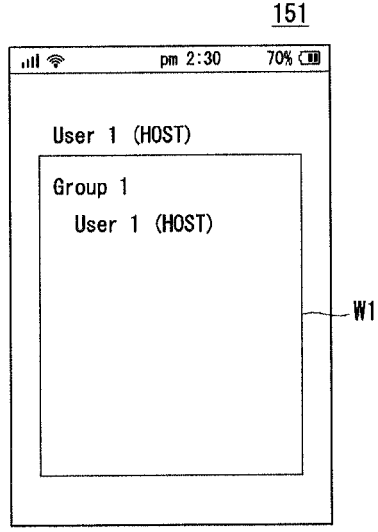
(b)

[Fig. 7]
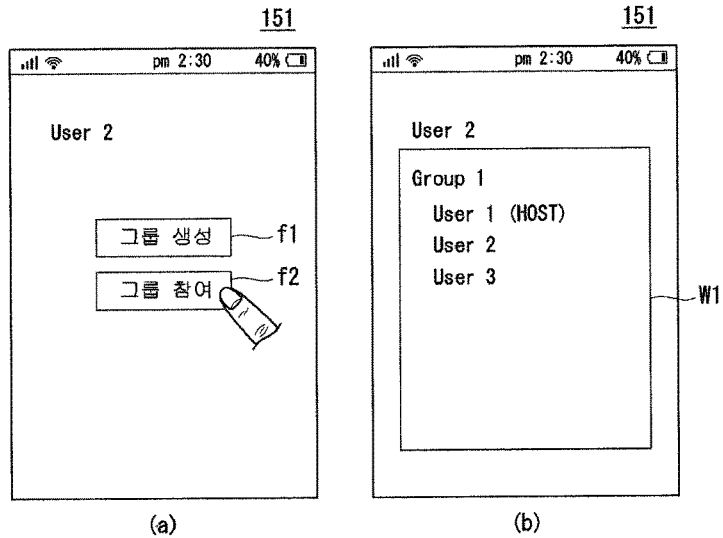
[Fig. 8]
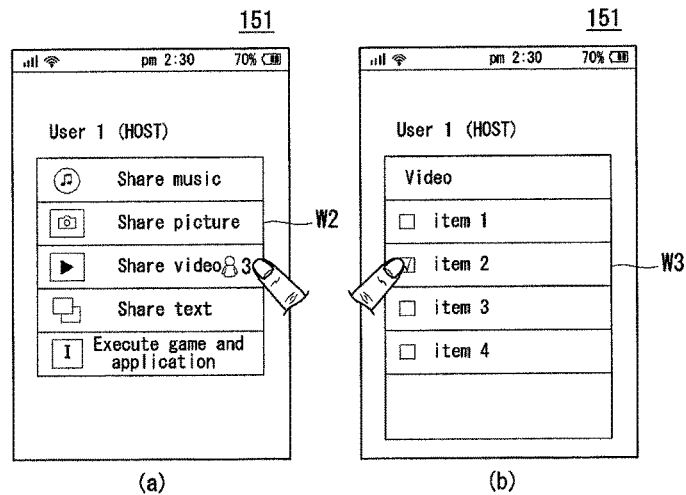
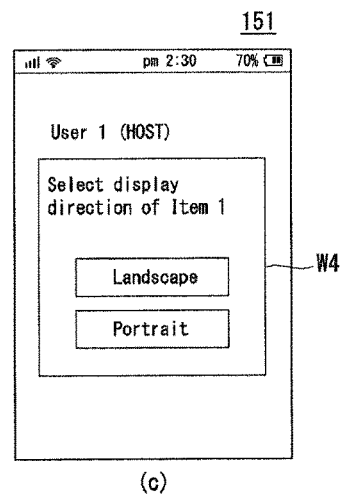

[Fig. 9]
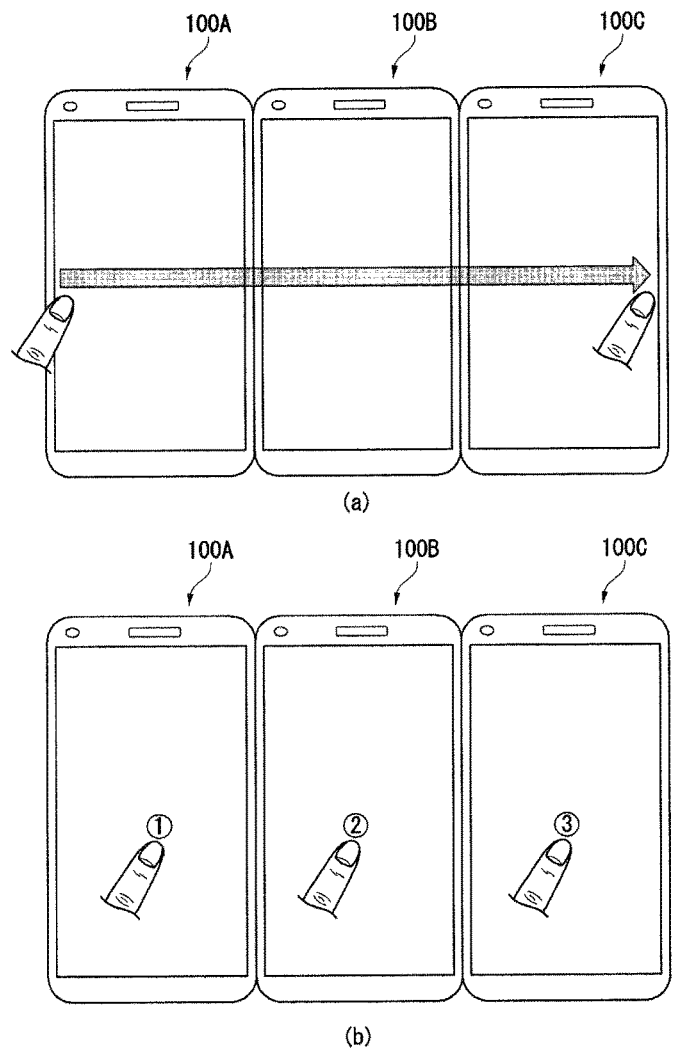
[Fig. 10]
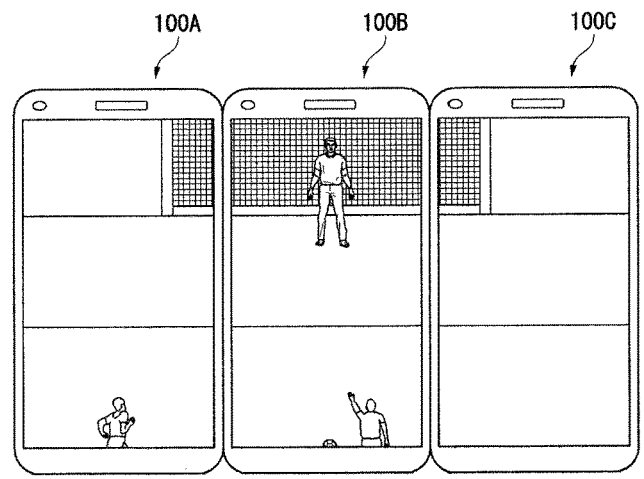

[Fig. 11]
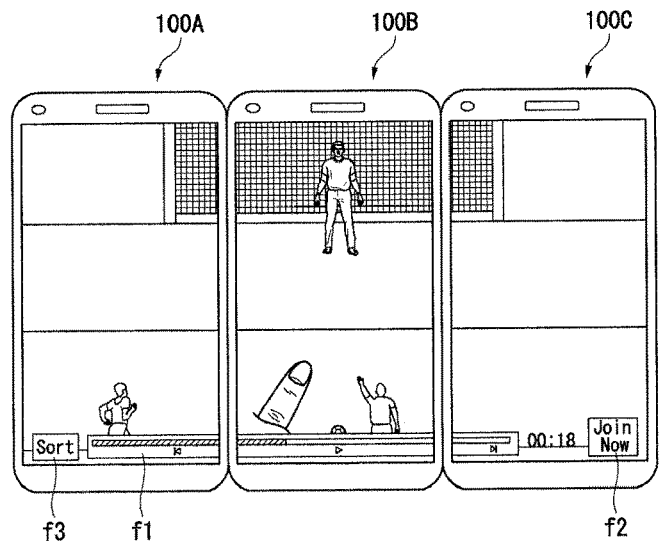
[Fig. 12]
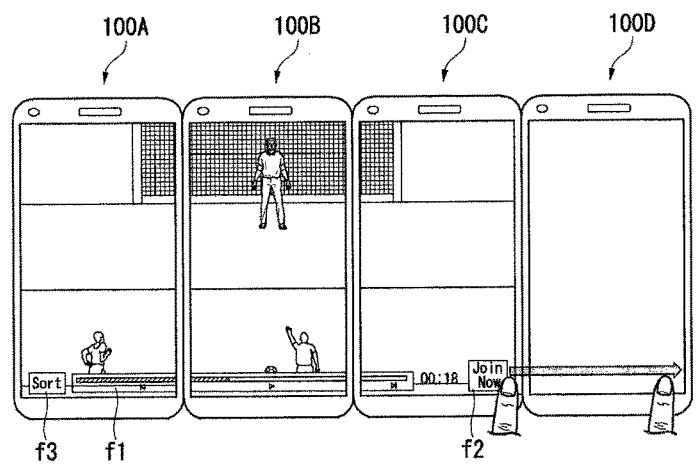
(a)
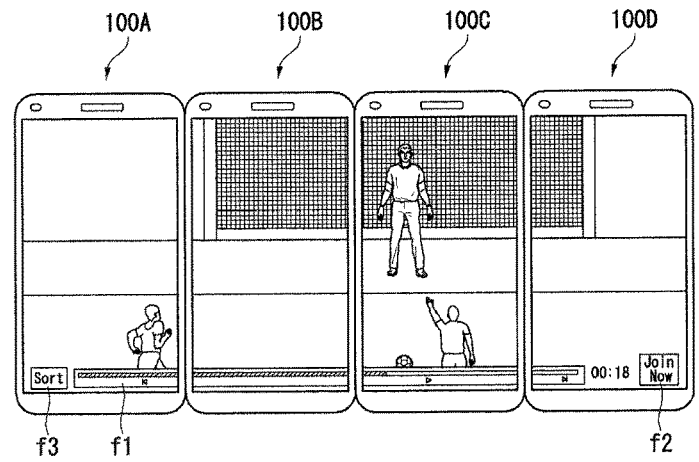
(b)

[Fig. 13]
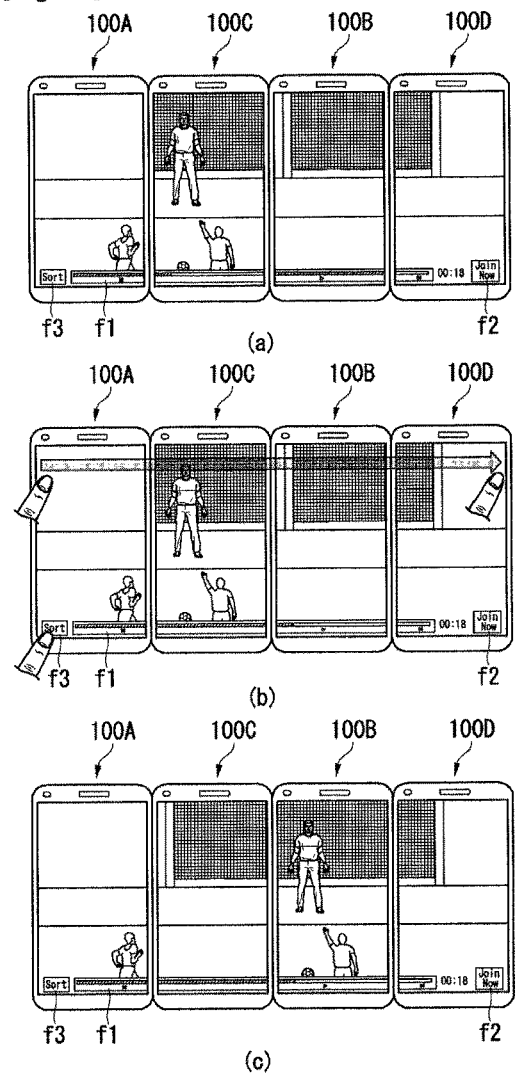
[Fig. 14]
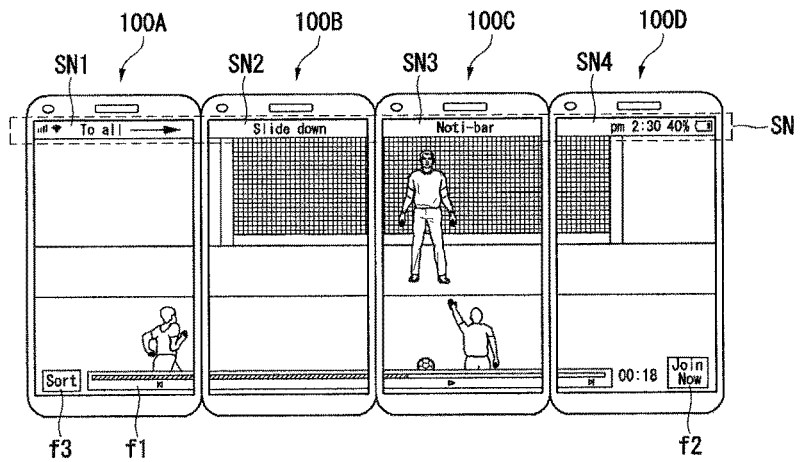

[Fig. 15]
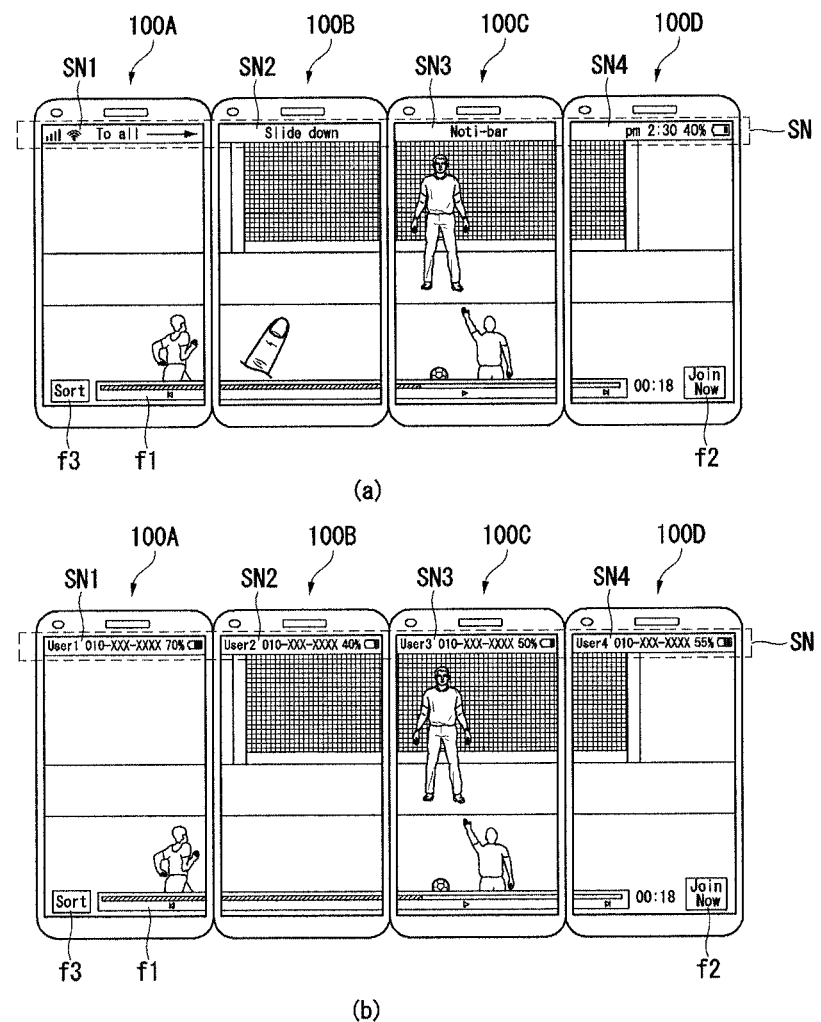

[Fig. 16]
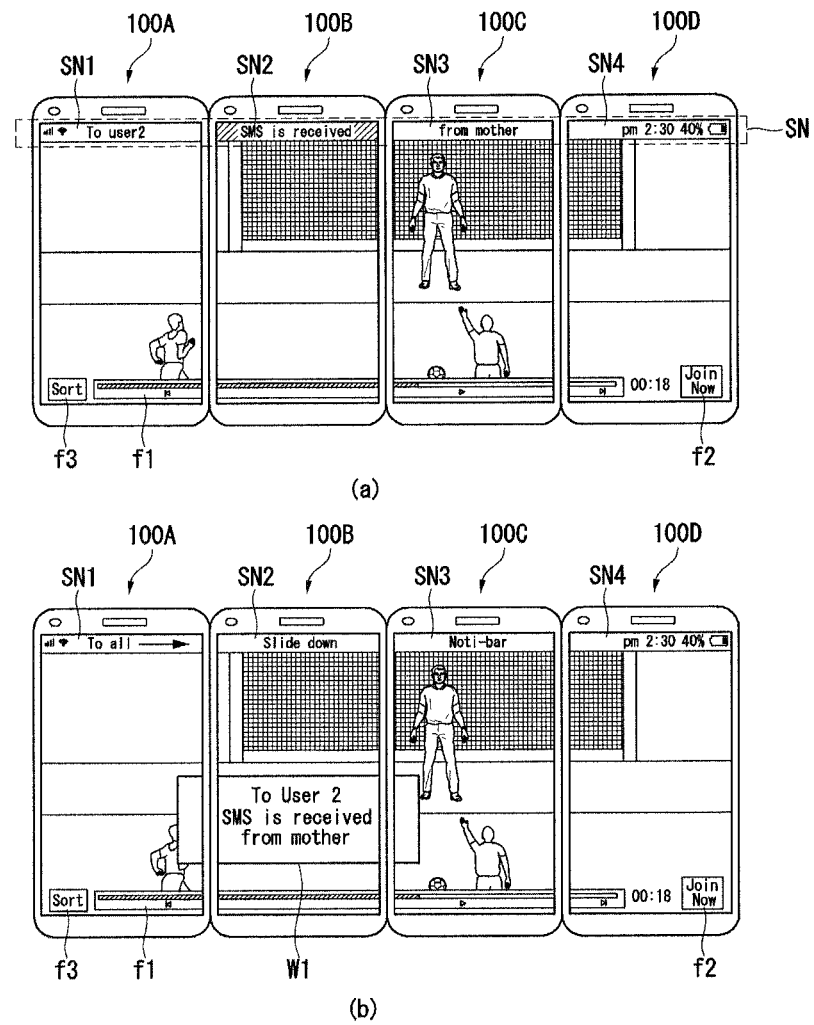

[Fig. 17]
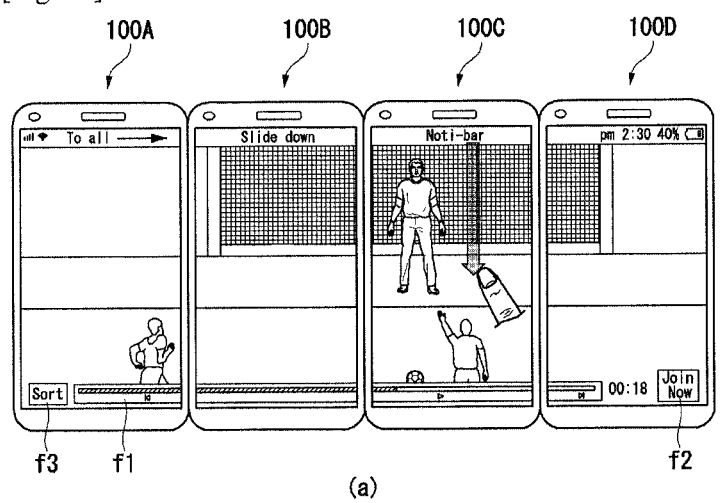
(a)
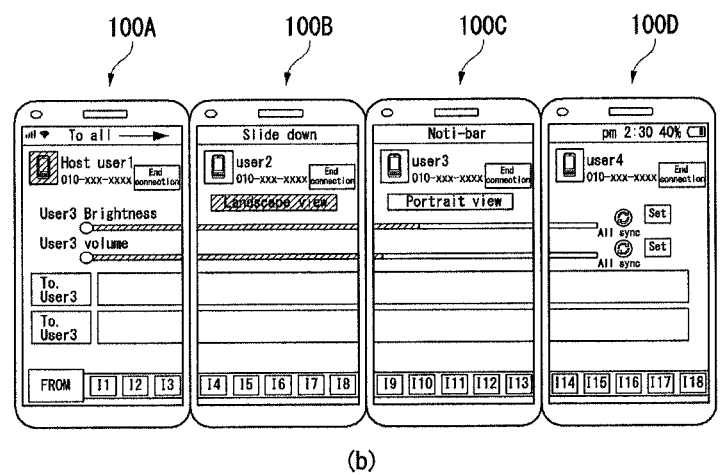
(b)

[Fig. 18]
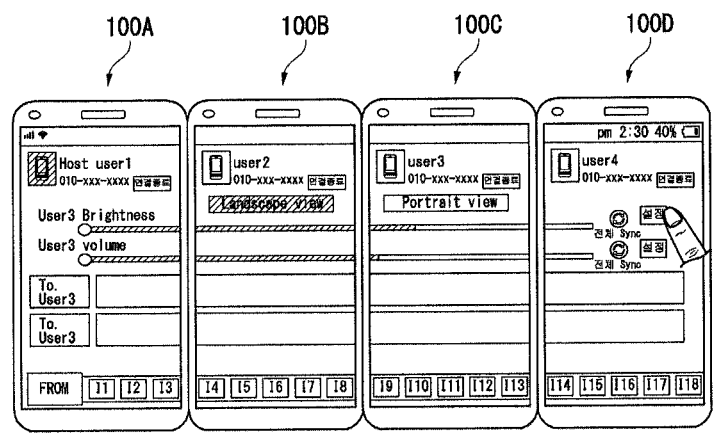
(a)
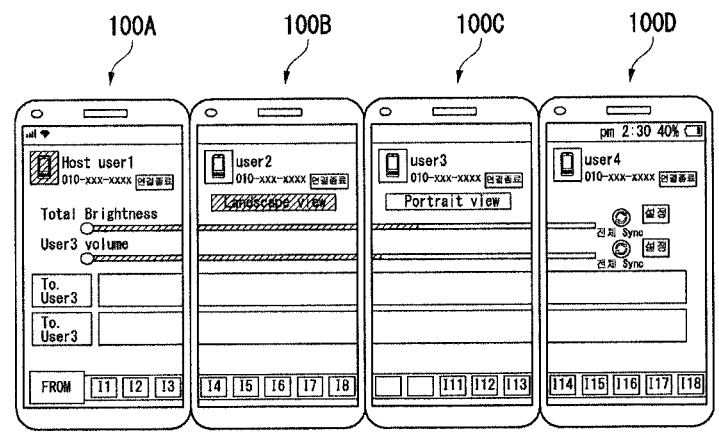
(b)

[Fig. 19]
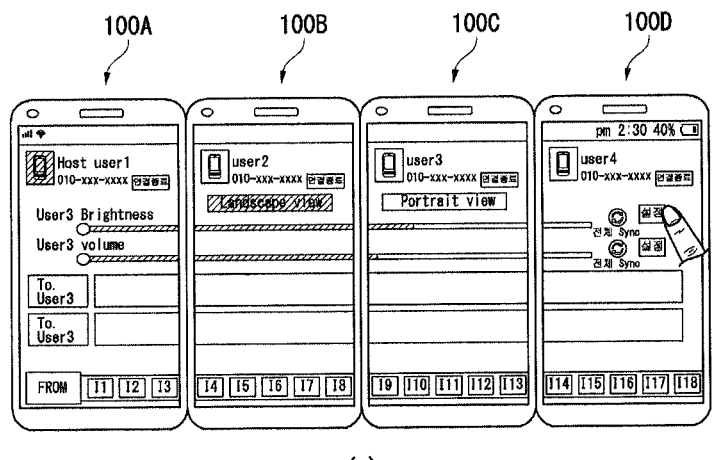
(a)
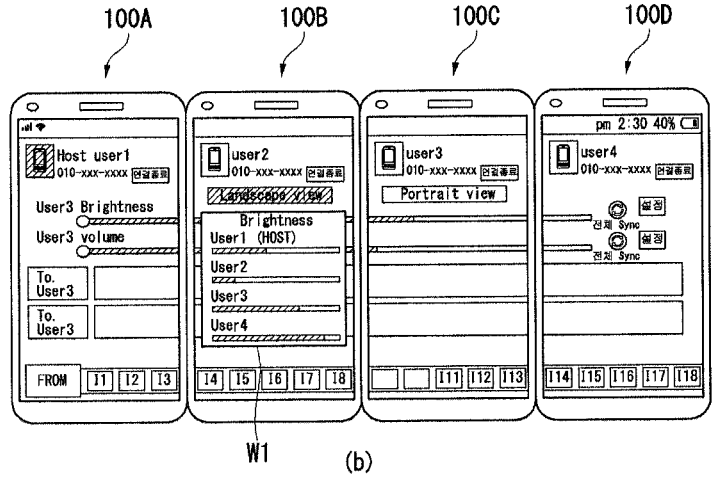
(b)

[Fig. 20]
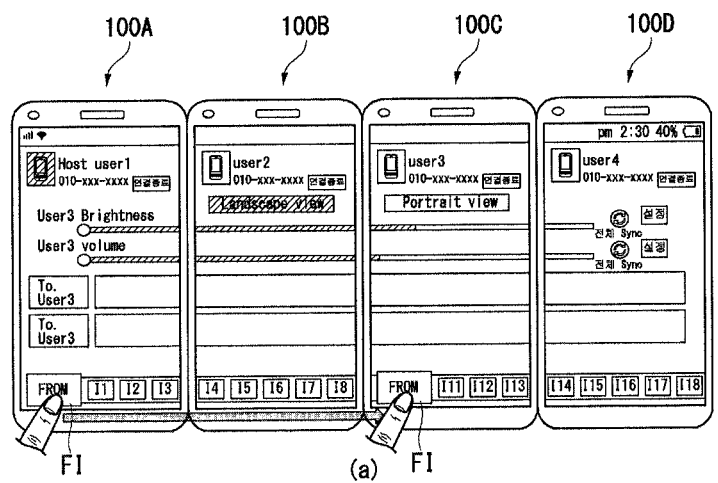
(a)
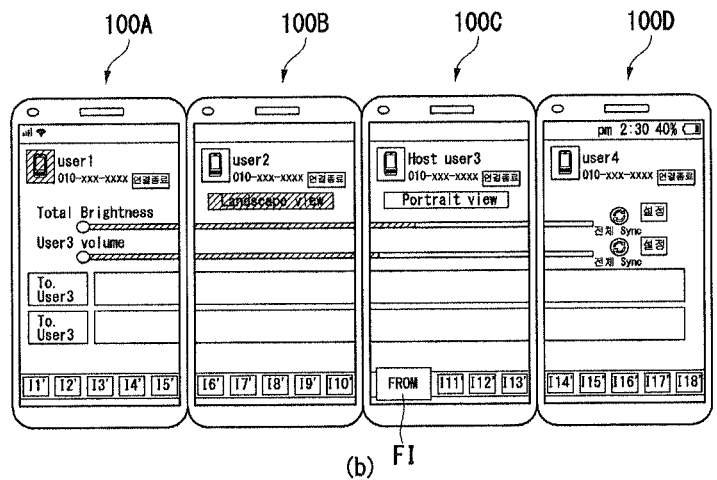
(b)

[Fig. 21]
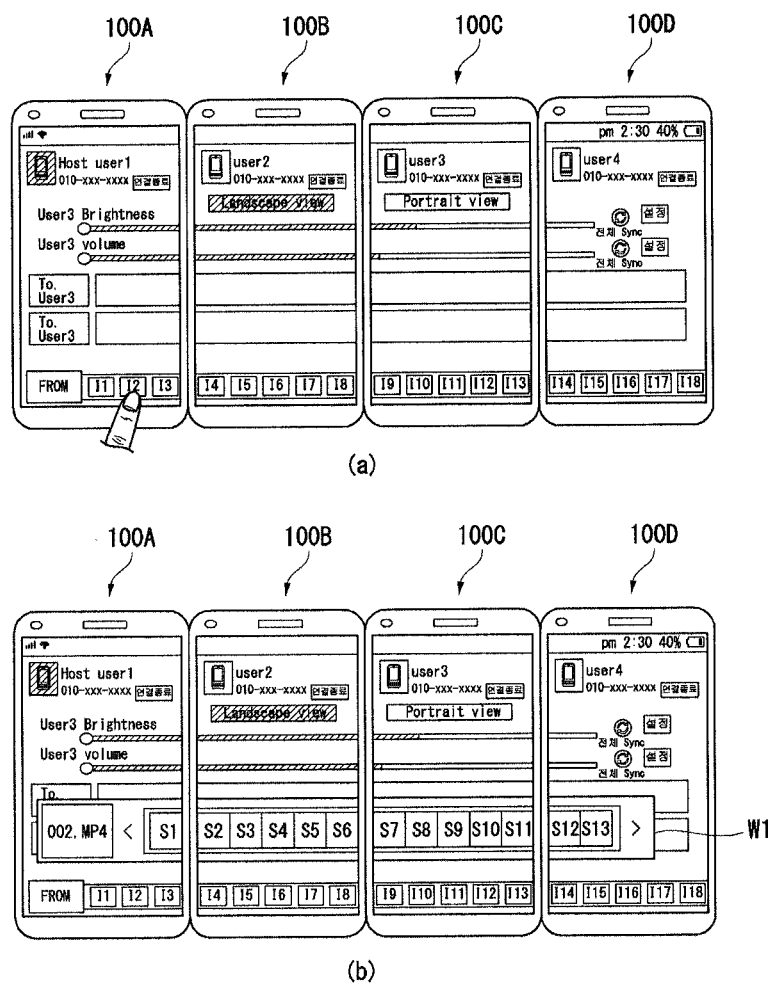

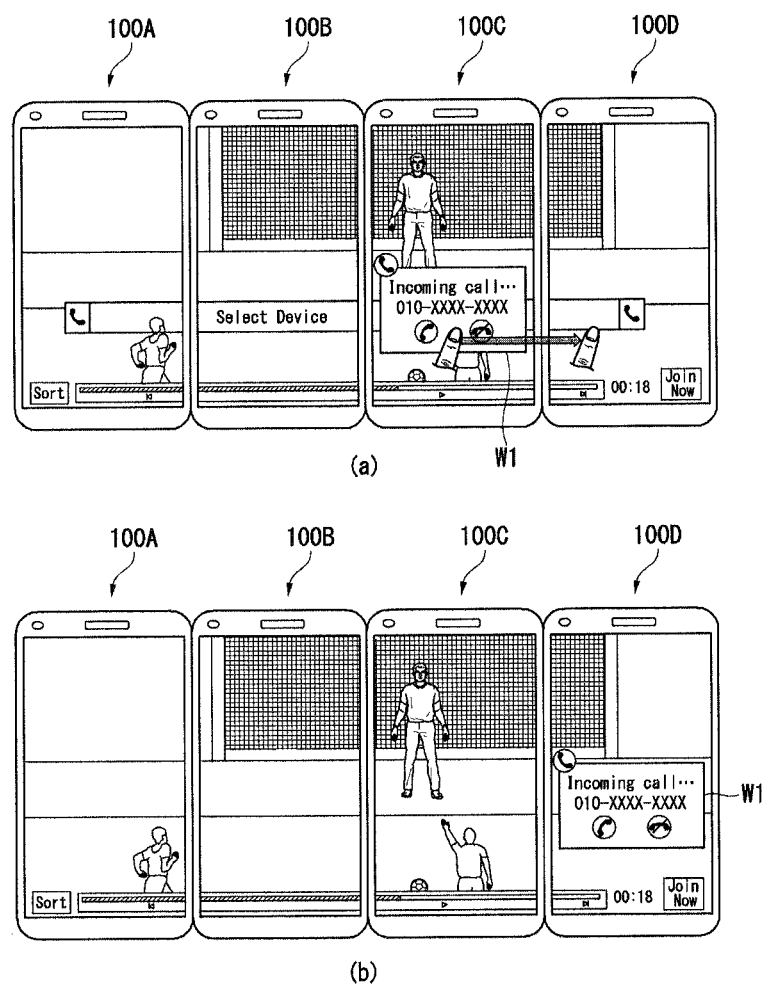

[Fig. 23]
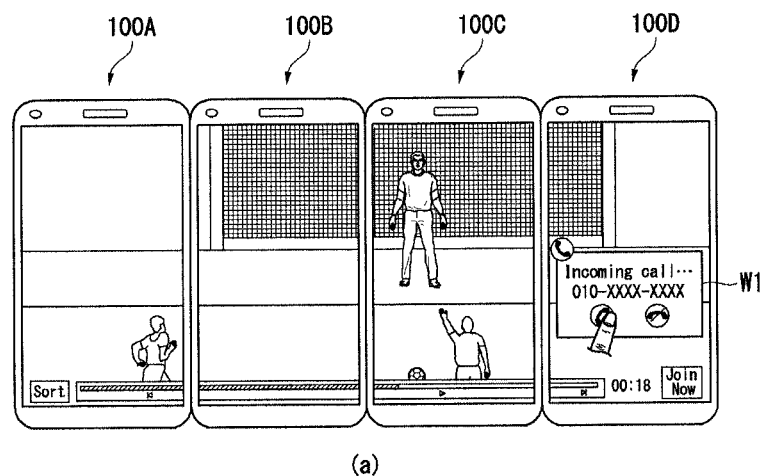
(a)
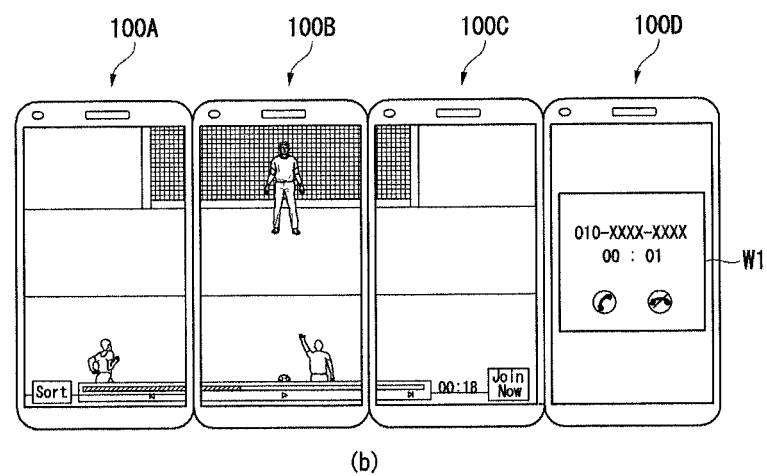
(b)

[Fig. 24]
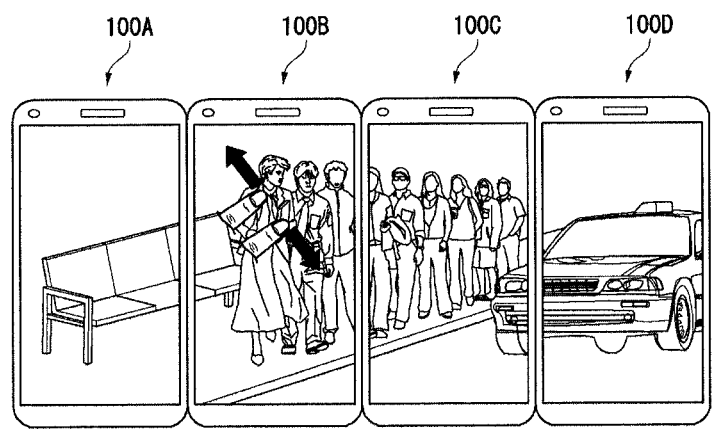
(a)
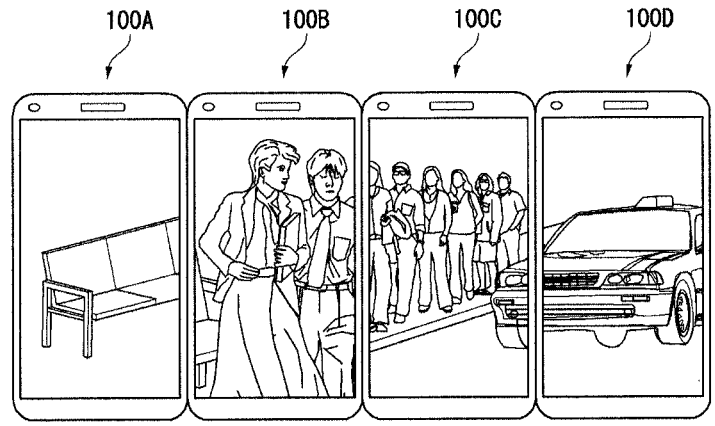
(b)

[Fig. 25]
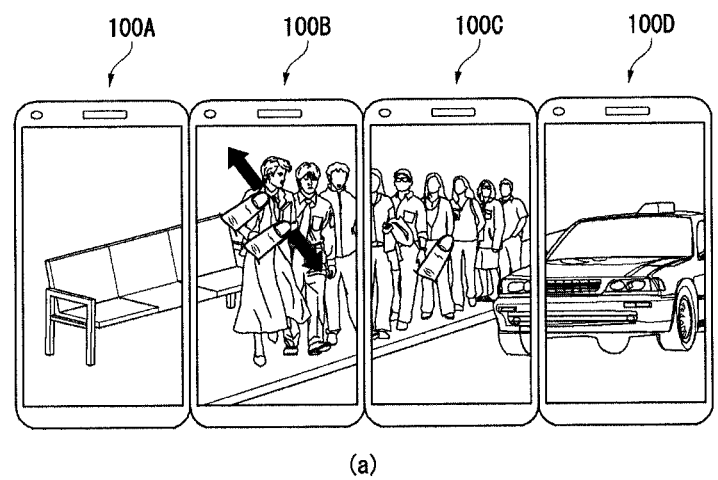
(a)
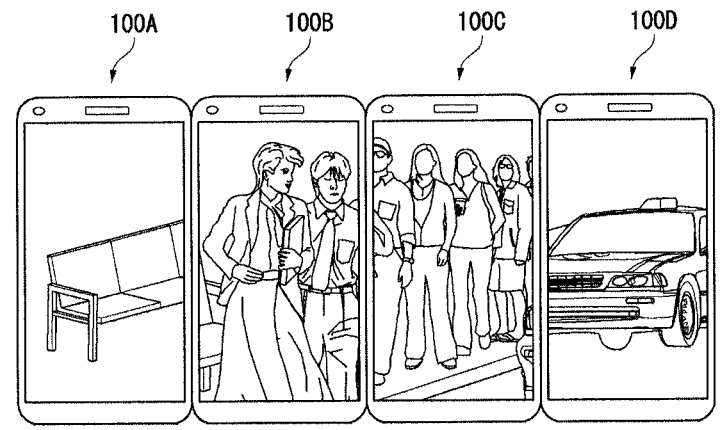
(b)

[Fig. 26]
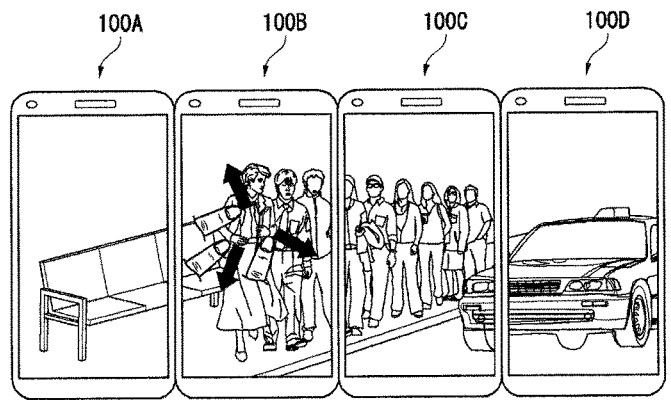
(a)
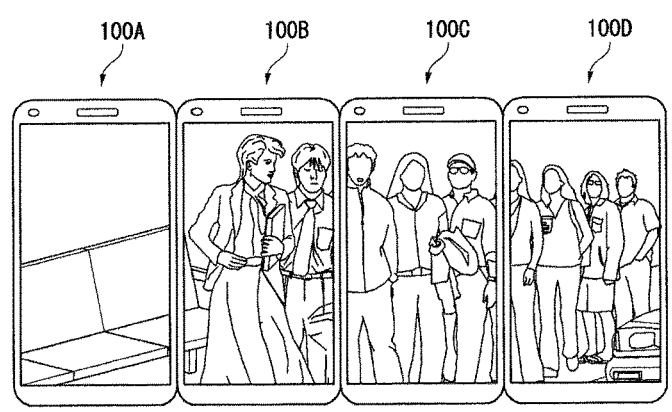
(b)
[Fig. 27]
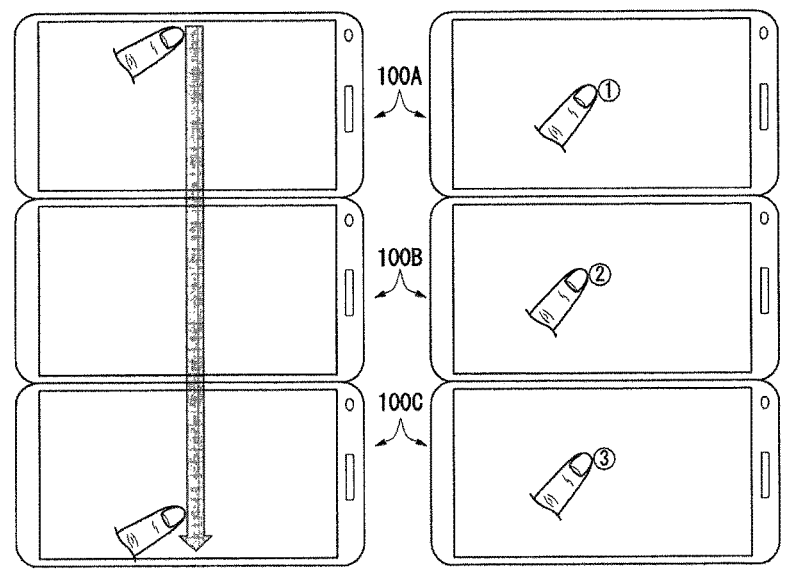
(a)        (b)

[Fig. 28]
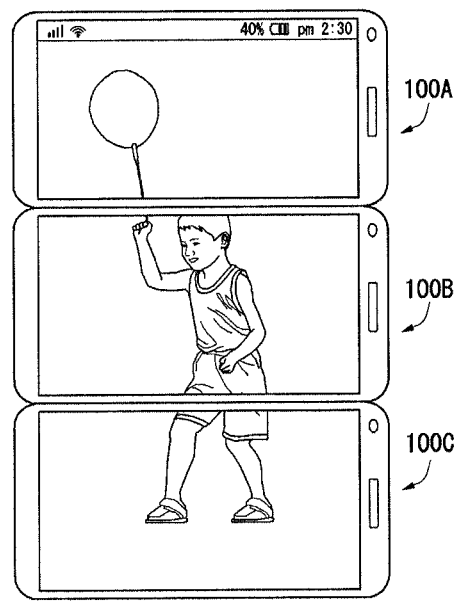
[Fig. 29]
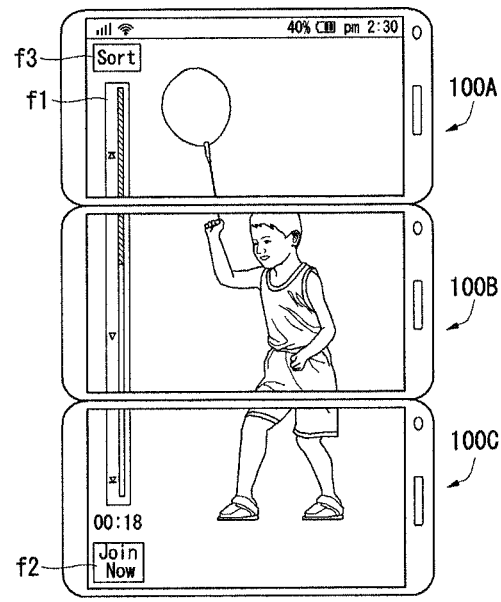

[Fig. 30]
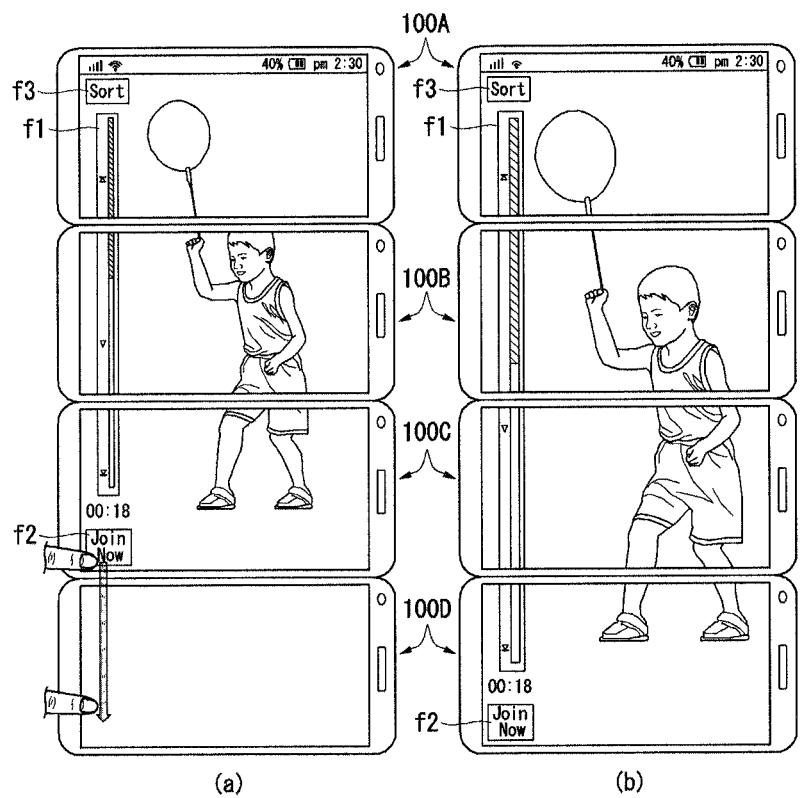

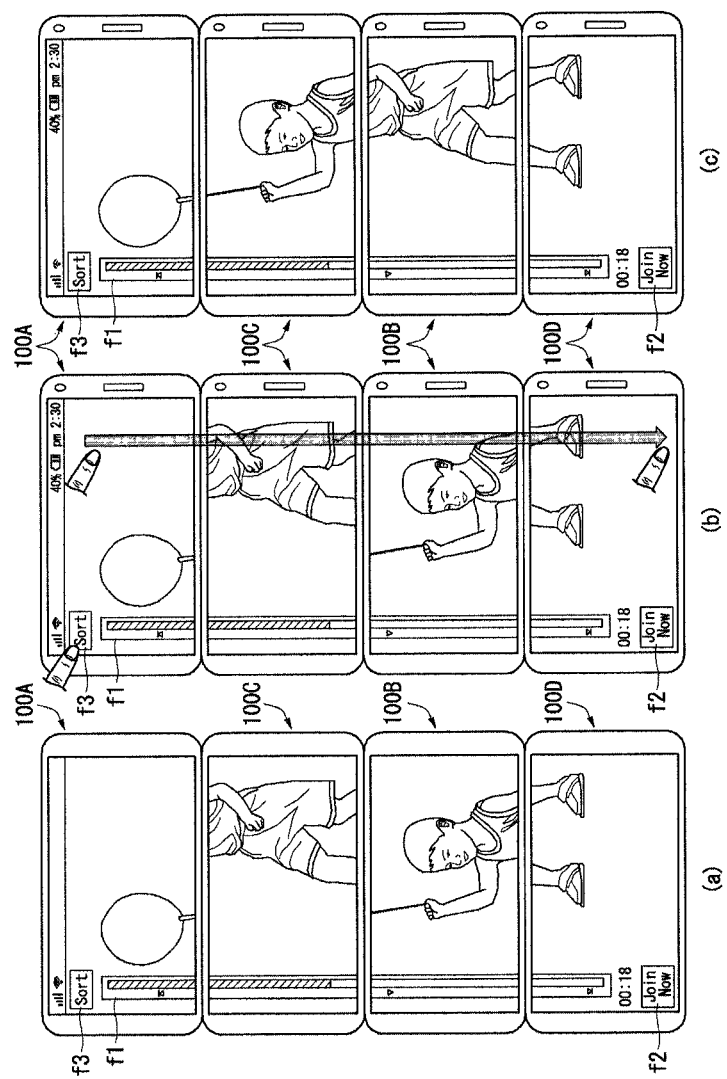
[Fig. 31]

[Fig. 32]
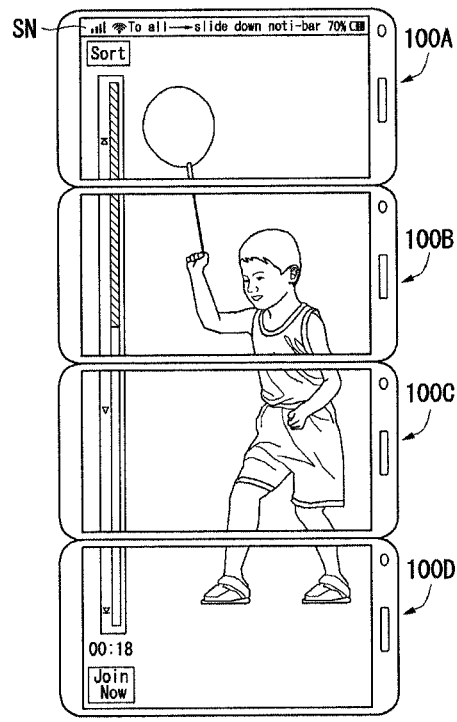
[Fig. 33]
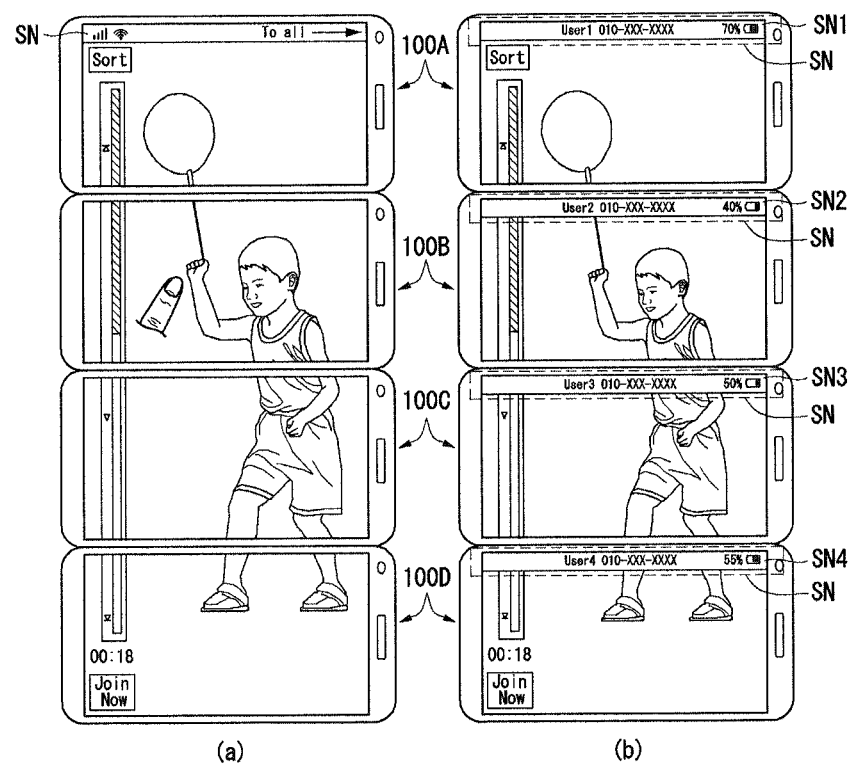
(a)  (b)

[Fig. 34]
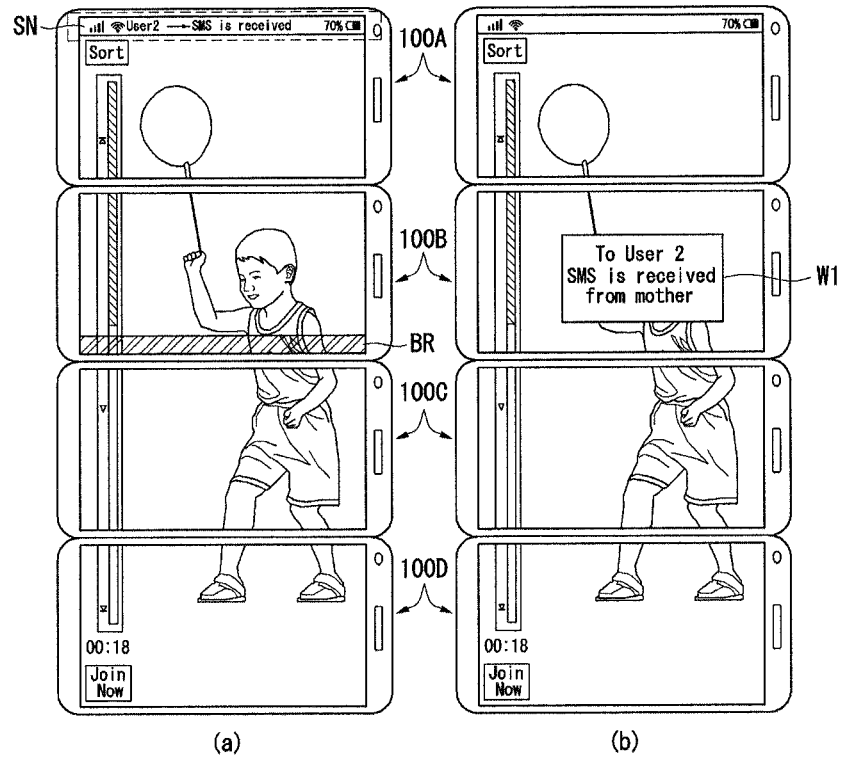
[Fig. 35]
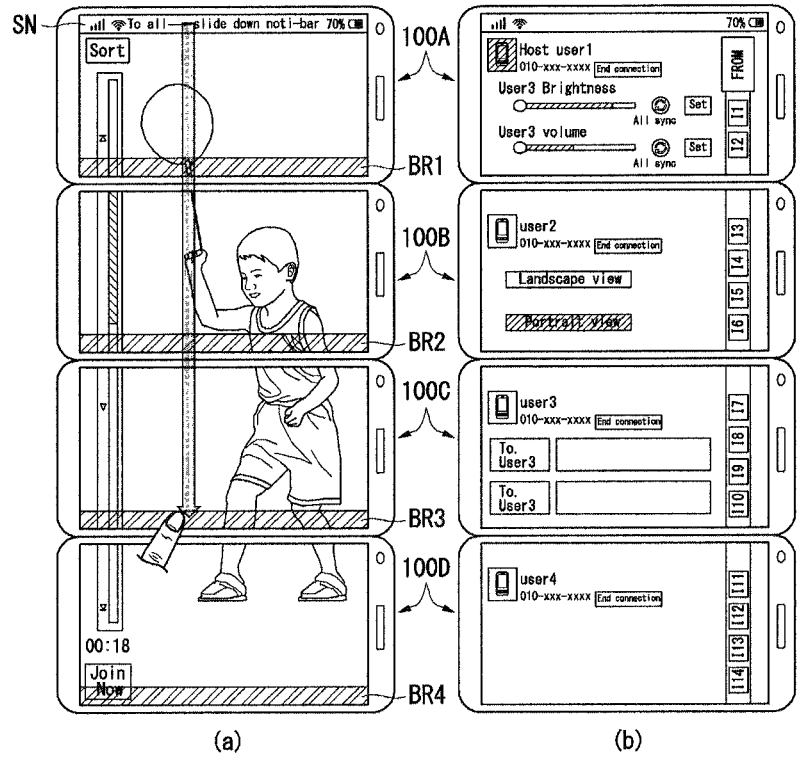

[Fig. 36]
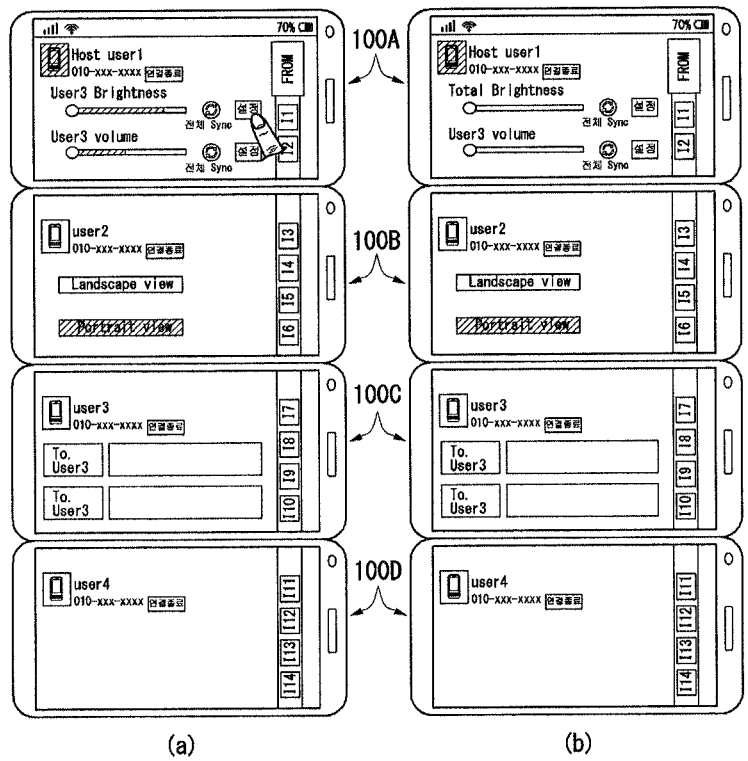
[Fig. 37]
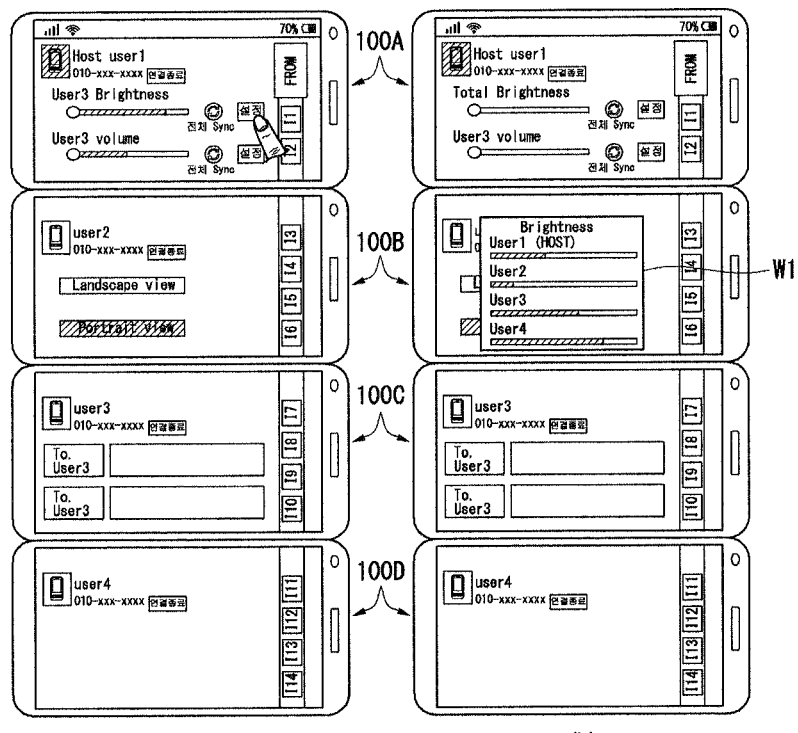

[Fig. 38]
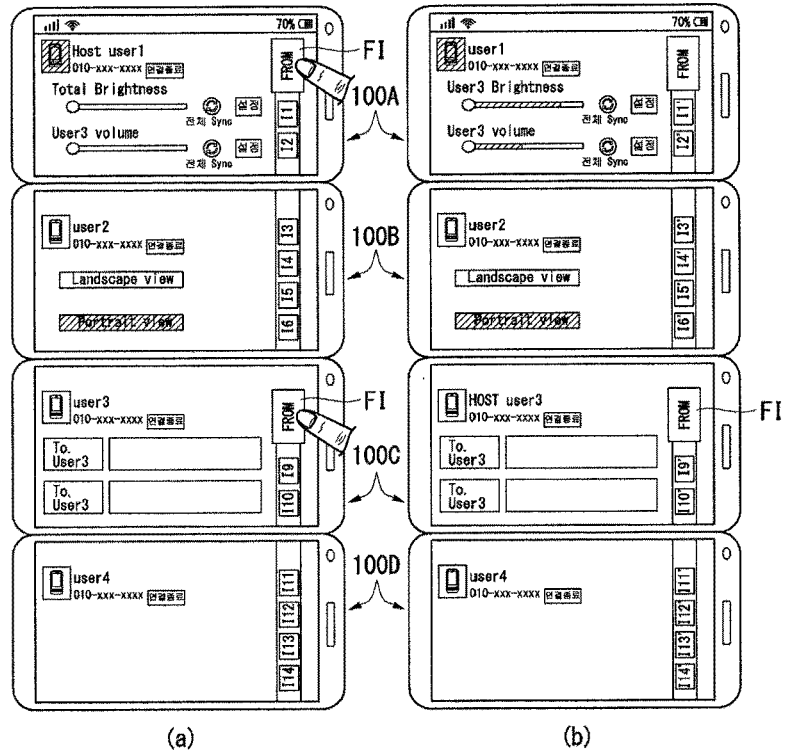
(a)      (b)
[Fig. 39]
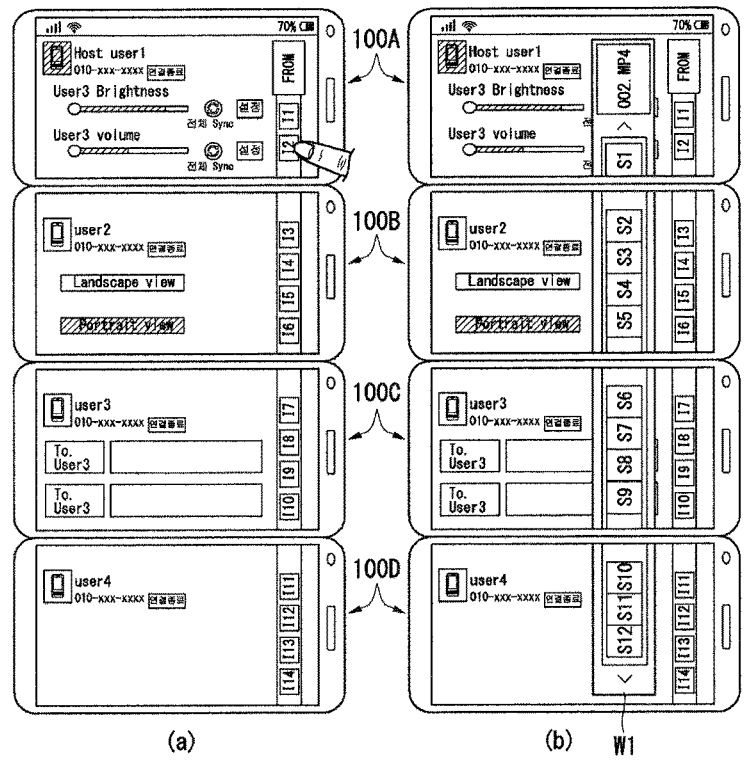
(a)      (b)

[Fig. 40]
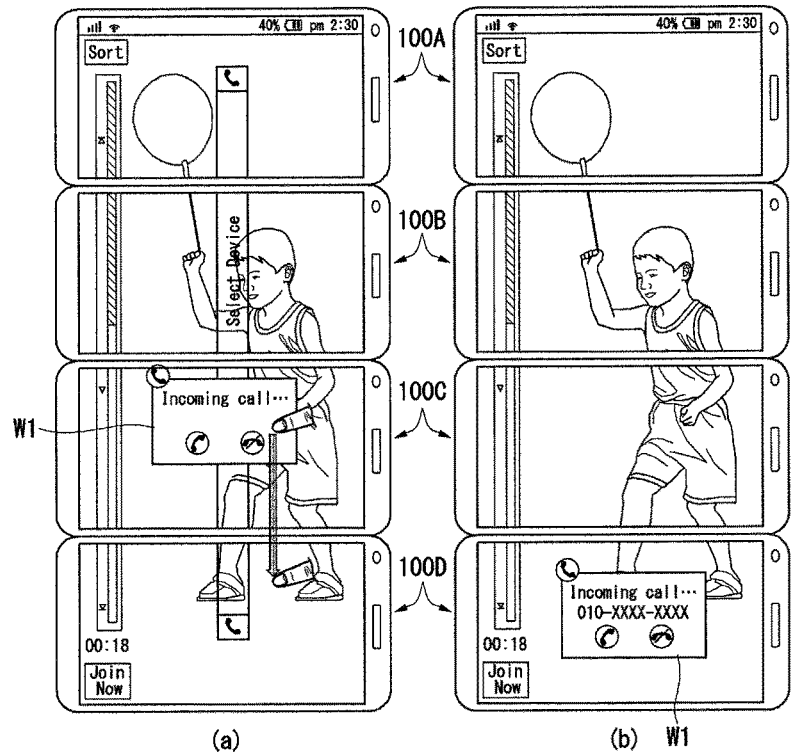
[Fig. 41]
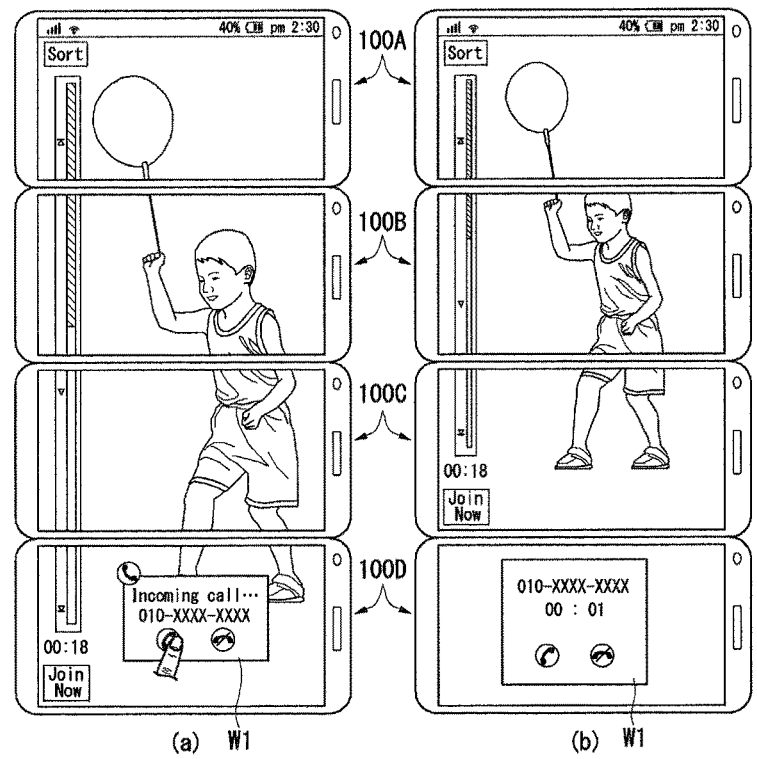

[Fig. 42]
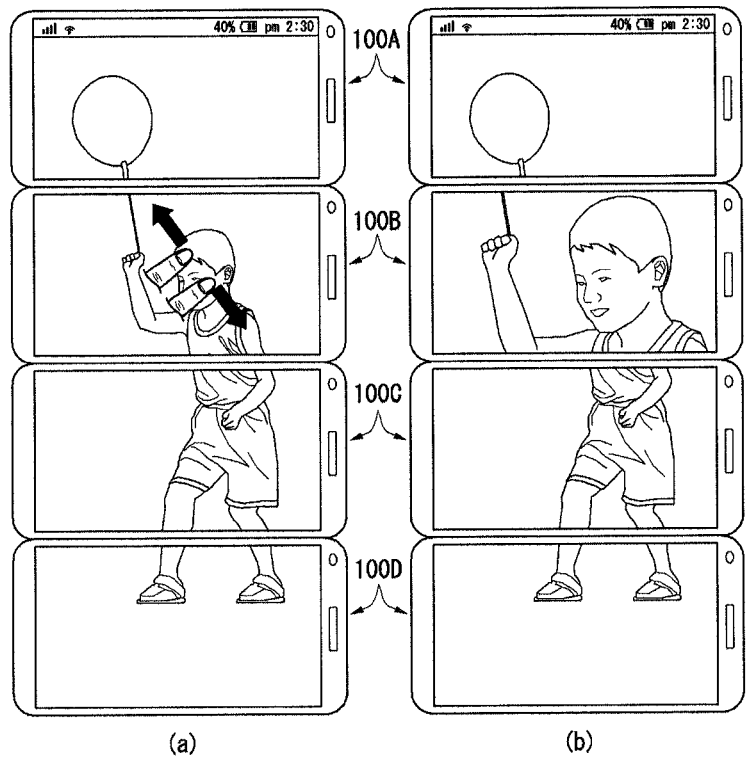
(a)      (b)
[Fig. 43]
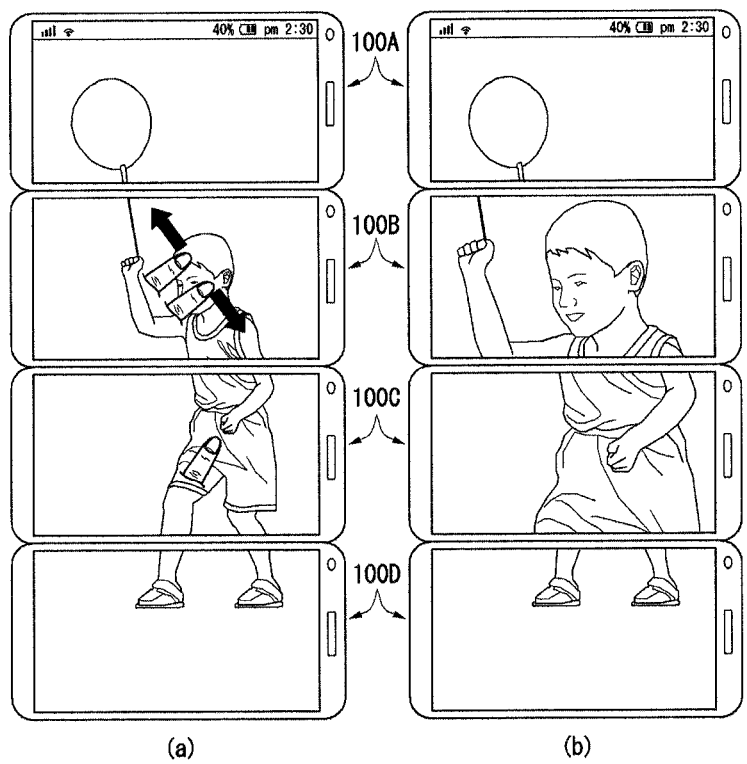
(a)      (b)

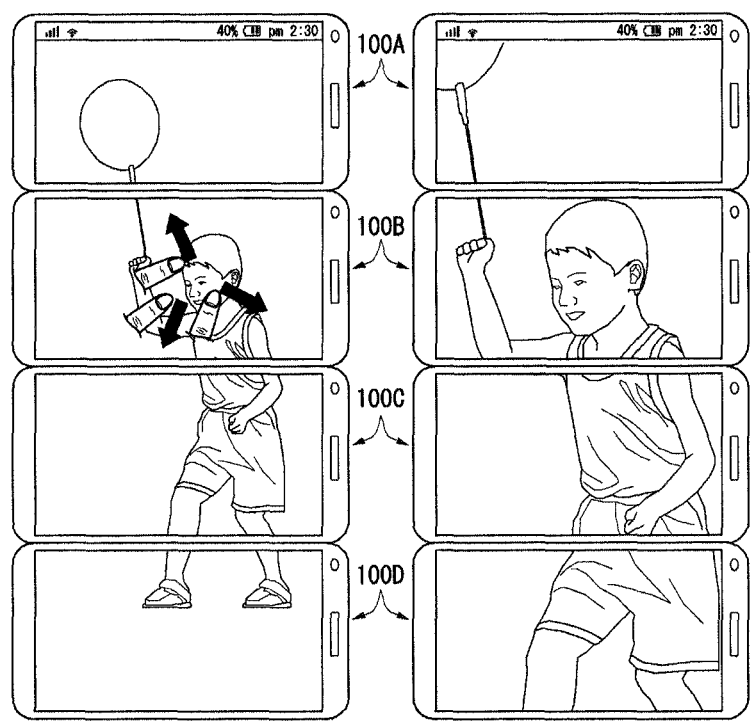
[Fig. 44]

ELECTRONIC DEVICE AND METHOD FOR CONTROLLING THE SAME

TECHNICAL FIELD

The present invention relates to an electronic device for controlling a plurality of electronic devices to share content and a method for controlling the same.

BACKGROUND ART

As the functionality of an electronic device, such as TV, a personal computer, a laptop computer, or a mobile phone, is diversified, the electronic device has been implemented in the form of a multimedia player having complex functions, such as the photographing of images and video, the playback of music and video files, gaming, and the reception of broadcasting.

The number of electronic devices capable of recognizing user input through a contact input unit is increasing as electronic devices become compact. Particularly, electronic devices including a touchscreen panel having a function of inputting through a display screen are generalized.

Since an electronic device including a touchscreen panel has a fixed bezel area in which images cannot be displayed due to wiring disposed therein, there is a limit in extending an image display area. In the case of portable electronic devices, users cannot view content through large screens because display size extension is limited.

Recently, a method of minimizing left and right bezel areas of an electronic device including a touchscreen panel by modifying a wiring structure has been developed. Accordingly, a technique of using touchscreen panels of a plurality of electronic devices through one user interface is required.

DISCLOSURE OF INVENTION

Technical Problem

An object of the present invention is to provide an electronic device including a user interface and a method of controlling the same, which enable a plurality of electronic devices included in one group to output the same content and output event or device information generated in one of the plurality of electronic devices through display units of the plurality of electronic devices.

Solution to Problem

In an embodiment, an electronic device may include a communication unit; a touchscreen; and a controller configured to generate a group of a plurality of electronic devices by paring the electronic device with at least one electronic device through the communication unit and to control the plurality of electronic devices included in the group to share at least part of content and to simultaneously display the content on touchscreens of the plurality of electronic devices, wherein the controller is configured to display at least part of the content on the touchscreen of each electronic device included in, the group on the basis of the number of touch inputs applied to the touchscreens of the electronic devices included in the group and touch input reception time, upon sequential reception of the touch inputs.

The touch inputs may correspond to a continuous touch input applied throughout the touchscreens of the electronic devices including bezel areas of the touchscreens.

The controller may be further configured to transmit at least part of the content and information about a time when the content will be displayed to each electronic device and to control the electronic devices included in the group to simultaneously display the content.

The controller may be further configured to set a display direction of the content and to determine at least part of the content to be displayed on each electronic device by considering the set display direction.

The controller may be further configured to display at least one of a first function key related to display of the content, a second function key for adding an electronic device to display the content and a third function key for re-setting display order of the content, upon reception of touch input applied to one of the touchscreens of the electronic devices during display of the content.

Upon reception of input for selecting the second function key and touch input applied to a touchscreen of an electronic device not included in the group, the controller may be further configured to regenerate a group including the electronic device not included in the group and to control the electronic devices included in the regenerated group to simultaneously display the content.

Upon reception of input for selecting the third function key and re-reception of touch inputs applied to the touchscreen of the electronic devices included in the group, the controller may be further configured to re-determine at least part of the content to be displayed on the touchscreen of each electronic device on the basis of the number of re-received touch inputs and touch input reception time.

The controller may be further configured to receive device information and event information from the electronic devices included in the group, to configure information to be displayed on a notification bar using the device information and event information and, upon reception of sliding input applied from one side of the touchscreen of one of the electronic devices, to display the notification bar throughout the touchscreens of the electronic devices according to sliding trajectory of the sliding input.

The controller may be further configured to reconfigure information to be displayed on the notification bar according to a specific electronic device to which the sliding input is applied.

The controller may be further configured to display a floating key for selecting a host electronic device for controlling the electronic devices included in the group on the notification bar, to move the floating key along a trajectory of drag input applied to the floating key upon reception of the drag input and to transmit a control signal for changing a specific electronic device on which the floating key is displayed to the host electronic device to the electronic devices included in the group.

The controller may be further configured to display at least one piece of content information stored in the host electronic device on the notification bar and, when the host electronic device is changed, to change the content information displayed on the notification bar to at least one piece of content information stored in the changed host electronic device.

The controller may be further configured to set indicator areas on the touchscreens of the electronic devices included in the group and to display device information or event information of a specific electronic device, selected from among device information or event information transmitted from the electronic devices included in the group according to a predetermined standard, throughout the indicator areas.

The device information may include at least one of brightness information, volume information and battery information and the event information may include at least one of call reception information, message reception information and notification reception information.

The controller may be further configured to display device information and event information transmitted from a specific electronic device from among the electronic devices included in the group in the indicator areas upon reception of touch input applied to a touchscreen of the specific electronic device and to restore the indicator areas to a previous state after a lapse of predetermined time The controller may be further configured to display event information corresponding to event generation notification, received from a specific electronic device from among the electronic devices included in the group, throughout the indicator areas set on the touchscreens of the electronic devices, upon reception of the event generation notification from the specific electronic device, wherein the controller is further configured to display the indicator areas such that display characteristics of an indicator area corresponding to the touchscreen of the specific electronic device are discriminated from those of indicator areas corresponding to the touchscreens of other electronic devices.

The controller may be further configured to display event information corresponding to event generation notification, received from a specific electronic device from among the electronic devices included in the group, through a pop-up window on the touchscreen of the specific electronic device, upon reception of the event generation notification from the specific electronic device.

The controller may be further configured to determine a specific electronic device to process an event corresponding to the event information according to a trajectory of drag input applied to the pop-up window in which the event information is displayed, upon reception of the drag input.

The controller may be further configured to cancel display of the shared content on the touch screen of the determined specific electronic device until processing of the event is finished and to control electronic devices included in the group other than the specific electronic device to simultaneously display the content.

In another embodiment, a method for controlling an electronic device includes: generating a group of a plurality of electronic devices by paring the electronic device with at least one electronic device; setting a host function of controlling the plurality of electronic devices included in the group; sequentially receiving touch inputs applied to touchscreens of the electronic devices included in the group; and displaying at least part of content on the touchscreen of each electronic device on the basis of the number of touch inputs and touch input reception time.

The method may further includes: transmitting at least part of the content and information about a time when the content will be displayed to each electronic device; and controlling the electronic devices included in the group to simultaneously display the content.

Details of embodiments are included in detailed description and drawings.

Advantageous Effects of Invention

According to one embodiment of the present invention, it is possible to determine or change at least part of content displayed on a plurality of electronic devices grouped into one group through touch inputs applied to the electronic devices using short range wireless communication.

In addition, according to one embodiment of the present invention, it is possible to use touchscreens of the plurality of electronic devices as one screen by displaying indicator areas and a notification bar, which are controlled in connection with each other, on the electronic devices.

Furthermore, according to one embodiment of the present invention, it is possible to control a specific electronic device from among the plurality of electronic devices to process an event generated in another electronic device through a touch gesture and to easily change a host electronic device by moving a floating key.

BRIEF DESCRIPTION OF DRAWINGS

The accompanying drawings, which are included to provide a further understanding of the invention and are incorporated in and constitute a part of this application, illustrate embodiments of the invention and together with the description serve to explain the principle of the invention.

FIG. 1 is a block diagram of an electronic device according to an embodiment of the present invention;

FIG. 2a is a front perspective view of the electronic device according to an embodiment of the present invention;

FIG. 2b is a rear perspective view of the electronic device according to an embodiment of the present invention;

FIGS. 3 and 4 are flowcharts illustrating a method of controlling an electronic device according to an embodiment of the present invention;

FIGS. 5, 6 and 7 are views for explaining a method of generating an electronic device group in the electronic device according to an embodiment of the present invention;

FIG. 8 is a view for explaining a method of selecting content to be shared by the electronic device according to an embodiment of the present invention;

FIGS. 9 and 10 are views for explaining a method of determining order of a plurality of devices in initial state when the electronic devices are controlled in landscape by the electronic device according to an embodiment of the present invention;

FIG. 11 is a view for explaining a method of displaying a function key during content playback when a plurality of electronic devices is controlled in landscape by the electronic device according to an embodiment of the present invention;

FIG. 12 is a view for explaining a method of including a new specific electronic device in a group when a plurality of electronic devices is controlled in landscape by the electronic device according to an embodiment of the present invention;

FIG. 13 is a view for explaining a method of determining order of a plurality of electronic devices during output of content when the electronic devices are controlled in landscape by the electronic device according to an embodiment of the present invention;

FIGS. 14, 15 and 16 are views for explaining a method of displaying event information or device information when a plurality of electronic devices is controlled in landscape by the electronic device according to an embodiment of the present invention;

FIGS. 17 to 21 are views for explaining information displayed on a notification bar when a plurality of electronic devices is controlled in landscape by the electronic device according to an embodiment of the present invention;

FIGS. 22 and 23 are views for explaining a method of changing an electronic device processing an event when a plurality of electronic devices is controlled in landscape by the electronic device according to an embodiment of the present invention;

FIGS. 24 to 26 are views for explaining a method of magnifying content when a plurality of electronic devices is controlled in landscape by the electronic device according to an embodiment of the present invention;

FIGS. 27 and 28 are views for explaining a method of determining order of a plurality of electronic devices in initial state when the electronic devices are controlled in portrait by the electronic device according to an embodiment of the present invention;

FIG. 29 is a view for explaining a method of displaying a function key during content playback when a plurality of electronic devices is controlled in portrait by the electronic device according to an embodiment of the present invention;

FIG. 30 is a view for explaining a method of including a new specific electronic device in a group when a plurality of electronic devices is controlled in portrait by the electronic device according to an embodiment of the present invention;

FIG. 31 is a view for explaining a method of determining order of a plurality of electronic devices during output of content when the electronic devices are controlled in portrait by the electronic device according to an embodiment of the present invention;

FIGS. 32 to 34 are views for explaining a method of displaying event information or device information when a plurality of electronic devices is controlled in portrait by the electronic device according to an embodiment of the present invention;

FIGS. 35 to 39 are views for explaining information displayed on a notification bar when a plurality of electronic devices is controlled in portrait by the electronic device according to an embodiment of the present invention;

FIGS. 40 and 41 are views for explaining a method of changing an electronic device that processes an event when a plurality of electronic devices is controlled in portrait by the electronic device according to an embodiment of the present invention; and FIGS. 42 to 44 are views for explaining a method of magnifying content when a plurality of electronic devices is controlled in portrait by the electronic device according to an embodiment of the present invention.

MODE FOR THE INVENTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes module and unit may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

FIG. 1 is a block diagram of a mobile terminal according to an embodiment. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply unit 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth, radio frequency identification (RFID), infrared data association (IrDA), ultra wideband (UWB) and/or Zig-Bee may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display module 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply unit 190 supplies power and/or whether the interface 170 is connected to an external device. The sensing unit 140 may also include a proximity sensor. The sensing unit 140 may sense a motion of the mobile terminal 100.

The output unit 150 may generate visual, auditory and/or tactile output, and the output unit 150 may include the display module 151, an audio output module 152, an alarm 153 and a haptic module 154. The display module 151 may display information processed by the mobile terminal 100. The display module 151 may display a user interface (UI) and/or a graphic user interface (GUI) related to a telephone call when the mobile terminal 100 is in the call mode. The display module 151 may also display a captured and/or received image, a UI or a GUI when the mobile terminal 100 is in the video telephony mode or the photographing mode.

The display module 151 may include at least one of a liquid crystal display, a thin film transistor liquid crystal display, an organic light-emitting diode display, a flexible display and/or a three-dimensional display. The display module 151 may be of a transparent type or a light transmissive type. That is, the display module 151 may include a transparent display.

The transparent display may be a transparent liquid crystal display. A rear structure of the display module 151 may also be of a light transmissive type. Accordingly, a user may see an object located behind the body (of the mobile terminal 100) through the transparent area of the body of the mobile terminal 100 that is occupied by the display module 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display module 151 and a sensor sensing touch (hereafter referred to as a touch sensor) form a layered structure that is referred to as a touch screen, the display module 151 may be used as an input device in addition to an output device. The touch sensor may be in the form of a touch film, a touch sheet, and/or a touch pad, for example.

The touch sensor may convert a variation in pressure applied to a specific portion of the display module 151 or a variation in capacitance generated at a specific portion of the display module 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display module 151.

The proximity sensor (of the sensing unit 140) may be located in an internal region of the mobile terminal 100, surrounded by the touch screen, and/or near the touch screen. The proximity sensor may sense an object approaching a predetermined sensing face or an object located near the proximity sensor using an electromagnetic force or infrared rays without having mechanical contact. The proximity sensor may have a lifetime longer than a contact sensor and may thus have a wide application in the mobile terminal 100.

The proximity sensor may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display module 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply unit 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

FIG. 2*a* is a front perspective view of a mobile terminal (or a handheld terminal) according to an embodiment.

The mobile terminal 100 may be a bar type terminal body. However, embodiments are not limited to a bar type terminal and may be applied to terminals of various types including slide type, folder type, swing type and/or swivel type terminals having at least two bodies that are relatively movably combined.

The terminal body may include a case (a casing, a housing, a cover, etc.) that forms an exterior of the mobile terminal 100. In this embodiment, the case may be divided into a front case 101 and a rear case 102. Various electronic components may be arranged in the space formed between the front case 101 and the rear case 102. At least one middle case may be additionally provided between the front case 101 and the rear case 102.

The cases may be formed of plastics through injection molding or made of a metal material such as stainless steel (STS) or titanium (Ti).

The display module 151, the audio output unit 152, the camera 121, the user input unit 130/131 and 132, the microphone 122 and the interface 170 may be arranged (or provided) in the terminal body, and more specifically may be arranged (or provided) in the front case 101.

The display module 151 may occupy most of the main face of the front case 101. The audio output unit 152 and the camera 121 may be arranged in a region in proximity to one of both ends of the display module 151 and the user input unit 131, and the microphone 122 may be located in a region in proximity to another end of the display module 151. The user input unit 132 and the interface 170 may be arranged (or provided) on sides of the front case 101 and the rear case 102.

The user input unit 130 may receive commands for controlling operation of the mobile terminal 100, and may include a plurality of operating units 131 and 132. The operating units 131 and 132 may be referred to as manipulating portions and may employ any tactile manner in which a user operates the operating units 131 and 132 while having tactile feeling.

The first and second operating units 131 and 132 may receive various inputs. For example, the first operating unit 131 may receive commands such as start, end and scroll and the second operating unit 132 may receive commands such as control of a volume of sound output from the audio output unit 152 or conversion of the display module 151 to a touch recognition mode.

FIG. 2*b* is a rear perspective view of the mobile terminal (shown in FIG. 2*a*) according to an embodiment.

Referring to FIG. 2*a*, a camera 121' may be additionally attached to the rear side of the terminal body (i.e., the rear case 102). The camera 121' may have a photographing direction opposite to that of the camera 121 (shown in FIG. 2*a*) and may have pixels different from those of the camera 121 (shown in FIG. 2*a*).

For example, it may be desirable that the camera 121 has low pixels such that the camera 121 may capture an image of a face of a user and transmit the image to a receiving part in case of video telephony while the camera 121' has high pixels because the camera 121' captures an image of a general object and does not immediately transmit the image in many cases. The cameras 121 and 121' may be attached (or provided) to the terminal body such that the cameras 121 and 121' may rotate or pop-up.

A flash bulb 123 and a mirror 124 may be additionally provided in proximity to the camera 121'. The flash bulb 123 may light an object when the camera 121' takes a picture of the object. The mirror 124 may be used for the user to look at his/her face in the mirror when the user wants to self-photograph himself/herself using the camera 121'.

An audio output unit 152' may be additionally provided on the rear side of the terminal body. The audio output unit 152' may achieve a stereo function with the audio output unit 152 (shown in FIG. 2*a*) and may be used for a speaker phone mode when the terminal is used for a telephone call.

A broadcasting signal receiving antenna may be additionally attached (or provided) to the side of the terminal body in addition to an antenna for telephone calls. The antenna constructing a part of the broadcasting receiving module 111 (shown in FIG. 1) may be set in the terminal body such that the antenna may be pulled out of the terminal body.

The power supply unit 190 for providing power to the mobile terminal 100 may be set in the terminal body. The power supply unit 190 may be included in the terminal body or may be detachably attached to the terminal body.

A touch pad 135 for sensing touch may be attached to the rear case 102. The touch pad 135 may be of a light transmission type, such as the display module 151. In this example, if the display module 151 outputs visual information through both sides thereof, the visual information may be recognized (or determined) by the touch pad 135. The information output through both sides of the display module 151 may be controlled by the touch pad 135. Otherwise, a display may be additionally attached (or provided) to the touch pad 135 such that a touch screen may be arranged (or provided) even in the rear case 102.

The touch pad 135 may operate in connection with the display module 151 of the front case 101. The touch pad 135 may be located in parallel with the display module 151 behind the display module 151. The touch panel 135 may be identical to or smaller than the display module 151 in size.

Embodiments of the present invention will now be described.

FIGS. 3 and 4 are flowcharts illustrating a method of controlling an electronic device according to an embodiment of the present invention and FIGS. 5 to 44 are views for explaining the method of controlling the electronic device according to an embodiment of the present invention.

Referring to FIG. 3, the controller (180 of FIG. 1) may generate a group (S110) and set a host function (120). Hereinafter, the controller refers to a controller of a host electronic device that controls a plurality of electronic devices included in a group to share and simultaneously display content, from among the plurality of electronic devices.

Specifically, the controller may generate the group by performing paring using at least one electronic device and short range wireless communication. A plurality of electronic devices included in the group can perform short range wireless communication. The electronic devices may include a host electronic device and one or more slave electronic devices. The host electronic device may make a pair with each slave electronic device included in the group and control each slave electronic device by transmitting a control signal thereto. That is, the host electronic device can execute a modem function for the slave electronic devices and transmit a control signal for sharing content to a plurality of slave electronic devices. The plurality of slave electronic devices can transmit, to the host electronic device, control signals requested by the host electronic device. For example, the plurality of slave electronic devices can transmit information on touch input reception time to the host electronic device upon reception of touch input applied to touchscreens thereof.

The controller (180 of FIG. 1) may sequentially receive touch inputs applied to touchscreens of the plurality of electronic devices included in the group (S130) and display at least part of content on the touchscreen of each electronic device according to the number and reception time of touch inputs (S140).

A user may apply sequential or continuous touch inputs to the touchscreens of the plurality of electronic devices arranged in a landscape or portrait direction. Specifically, the user may sequentially touch points on the touchscreens of the electronic devices or continuously touch the touchscreens of the electronic devices including bezel areas of the electronic devices. The controller may receive touch input notification about each electronic device from the electronic devices belonging to the group.

The controller may control the electronic devices to simultaneously display the same content. In this case, the electronic devices may respectively display segments of the content or display the whole content.

When content is segmented and displayed by the electronic devices, the controller may detect the number and arrangement order of electronic devices on the basis of the number of touch inputs and touch input reception time received from the electronic devices and determine a method of segmenting content to be shared and the number of segments of the content on the basis of the number and arrangement order of the electronic devices. The controller may set a content display direction according to a direction in which the electronic devices are arranged and segment the content in consideration of the content display direction.

The controller may control the content segmented and respectively displayed by the electronic devices to be naturally connected by transmitting the segments of the content to the electronic devices according to the arrangement order of the electronic devices.

Referring to FIG. 4, the controller (180 of FIG. 1) may transmit at least part of the content and content display time to each electronic device (S150) and control the plurality of electronic devices to simultaneously display the content (S160).

The controller may transmit content display time information along with the whole content or some segments of the content to the electronic devices. That is, the controller may transmit time information for synchronization of play times of the content transmitted to the electronic devices.

In addition, upon reception of touch input applied to one of the touchscreens of the plurality of electronic devices displaying the content, the controller (180 of FIG. 1) may display at least one of a first function key for displaying content, a second function key for adding an electronic device that will display content and a third function key for resetting content display order.

Upon reception of input for selecting the second function key and touch input applied to a touchscreen of a specific electronic device that is not included in the group, the controller (180 of FIG. 1) may regenerate a group including the specific electronic and control a plurality of electronic devices included in the regenerated group to simultaneously display content on touchscreens thereof.

Specifically, upon reception of touch inputs sequentially applied to the second function key and the touchscreen of the specific electronic device or reception of touch input of dragging the second function key passing through the bezel area of the touchscreen of the specific electronic device, the controller may determine the received touch input as a control signal for requesting group regeneration and regenerate the group including the specific electronic device. Upon regeneration of the group, the controller may segment the content on the basis of the number of electronic devices finally included in the group and retransmit the segmented content to the plurality of electronic devices included in the group. In this case, the controller may transmit the last segment of the content to the specific electronic device.

Upon reception of input for selecting the third function key and touch inputs applied to the touchscreens of the electronic devices included in the group, the controller (180 of FIG. 1) may determine at least part of the content to be displayed on the touchscreen of the electronic devices on the basis of the number of the received touch inputs and touch input reception time. That is, when display order of some of the plurality of electronic devices is changed while the electronic devices simultaneously display the content and thus segments of the content are not naturally connected, the controller can reset content segment display order according to the received touch inputs.

According to the present invention, content segment display order can be easily set before or during content playback through touch inputs applied to the touchscreens of the plurality of electronic devices.

The controller (180 of FIG. 1) may manage notification bars of the plurality of electronic devices as one notification bar. The controller may receive device information and event information from the plurality of electronic devices included in the group and configure information to be displayed on the notification bars using the device information and event information. When the controller receives sliding input from one side of one of the touchscreens of the plurality of electronic devices, the controller may display the notification bar on the touchscreens of the plurality of electronic devices according to sliding trajectory.

The controller may reconfigure information to be displayed on the notification bar such that the information corresponds to a specific electronic device from which the sliding input has been received. For example, upon reception of sliding input from one side of a touchscreen of a second electronic device, the controller can reconfigure the notification bar such that device information or event information about the second electronic device is displayed as representative information or preferentially displayed on the notification bar displayed on the touchscreens of the plurality of electronic devices.

The controller may configure the notification bar such that the notification bar includes at least one of device information, event information, a content list and a control menu.

The controller may display a floating key through which the host electronic device for controlling electronic devices included in the group can be selected on the notification bar and transmit a control signal for changing a specific electronic device on which the floating key is displayed to the host electronic device to the electronic devices upon reception of drag input applied to the floating key. When the host electronic device is changed, the controller may change a content list displayed on the notification bar to a content list stored in the changed host electronic device and display the changed content list.

The controller (180 of FIG. 1) may set an indicator area on the touchscreens of the electronic devices included in the group and display, in the indicator area, device information or event information about a specific electronic device, which is selected from among device information or event information transmitted from the electronic devices included in the group according to a predetermined standard. The controller may manage the indicator areas of the plurality of electronic devices as one indicator area. Specifically, the controller may receive information displayed on the indicator areas of the touchscreens of the electronic devices from the electronic devices, select representative information from the received information and display the representative information in the indicator areas of the touchscreens of the electronic devices. Here, the controller may select device information regarding a maximum or minimum value, from among device information received from the electronic devices as the representative information. Device information may include at least one of brightness information, volume information and battery information and event information may include at least one of call reception information, message reception information and notification reception information. For example, can display, in the indicator areas, minimum battery information from among the device information received from the electronic devices.

Upon reception of touch input applied to a touchscreen of a specific electronic device from among the electronic devices included in the group, the controller (180 of FIG. 1) may display, in the indicator areas of the electronic devices, device information or indicator information of electronic devices, which corresponds to the electronic devices. Here, the controller may restore the indicator areas to the previous state after a lapse of predetermined time.

Upon reception of event generation notification from a specific electronic device from among the electronic devices belonging to the group, the controller (180 of FIG. 1) may display event information corresponding to the event generation notification in the indicator areas of the touchscreens of the electronic devices or display the event information as a pop-up window. In this case, the controller may control display characteristics of the indicator area corresponding to the touchscreen of the specific electronic device to be discriminated from those of the indicator areas corresponding the touchscreens of other electronic devices or control the information displayed through the pop-up window to be included only in the touchscreen of the specific electronic device.

Upon reception of drag input applied to the pop-up window displaying the event information, the controller (180 of FIG. 1) may determine a specific electronic device to process the corresponding event according to the trajectory of the drag input. The controller may cancel display of content on the touchscreen of the specific electronic device until event processing is finished and control electronic devices included in the group other than the specific electronic device to simultaneously display the content.

A description will be given of a method for controlling the electronic device according to an embodiment of the present invention with reference to FIGS. 5 to 44.

FIGS. 5, 6 and 7 are views for explaining a method for generating a group by the electronic device according to an embodiment of the present invention.

Referring to FIG. 5, the controller (180 of FIG. 1) may execute a specific application I8 for enabling a plurality of electronic devices to share and simultaneously display content.

Referring to FIG. 6, the controller (180 of FIG. 1) may display a group generation menu f1 and a group join menu f2 on the execution screen of the specific application.

The controller may generate a new group Group1 and display electronic devices included in the group Group1 through a pop-up window W1 upon reception of input applied to the group generation menu f1. In addition, the controller may display a host electronic device that executes a host function from among the electronic devices included in the group Group1

Referring to FIG. 7, a controller of a slave electronic device may join in the generated group by selecting the group join menu f2 displayed on the execution screen of the specific application.

Specifically, upon selection of the group join menu f2, the controller of the slave electronic device may join in the group by transmitting a group join request signal to the host electronic device and receiving a group join approval signal from the host electronic device.

When the slave electronic device joins in the group, electronic devices included in the group in which the slave electronic device joins may be displayed on the pop-up window W1.

FIG. 8 is a view for explaining a method for selecting to-be-shared content by the electronic device according to an embodiment of the present invention.

Referring to FIG. 8, the controller (180 of FIG. 1) may display lists from which at least one content can be selected on pop-up windows W2 and W3 and determine content item2 to be shared according to input for selecting an item from a list.

The controller may display a window W4 for selecting a display direction of the determined content item2. The controller may select landscape or portrait as the content display direction.

FIGS. 9 to 26 are views for explaining a method for controlling a plurality of electronic devices in landscape by the electronic device according to an embodiment of the present invention.

FIGS. 9 and 10 are views for explaining a method for determining order of a plurality of electronic devices in initial states when the electronic devices are controlled in landscape by the electronic device according to an embodiment of the present invention.

Referring to FIGS. 9 and 10, upon sequential reception of touch inputs applied to touchscreens of the plurality of electronic devices included in the group, the controller (180 of FIG. 1) may simultaneously display at least part of content on the touchscreens of the electronic devices on the basis of the number of touch inputs and touch input reception time.

Upon reception of continuous touch input applied throughout the touchscreens of the electronic devices arranged in landscape, including bezels of the electronic devices (refer to FIG. 9(a)), or reception of discrete and sequential touch inputs respectively applied to the touchscreens (refer to FIG. 9(b)), the controller may obtain information about the number of electronic devices included in the group and touch input reception time. The controller may divide the content to be displayed on one screen into as many segments as the number of electronic devices and determine electronic devices displaying the divided content on the basis of the touch input reception time. That is, the controller can recognize arrangement order of the electronic devices according to touch input received through the touchscreens of the electronic devices.

The controller may transmit the segmented content to the corresponding electronic devices and control the electronic devices to simultaneously display received content. Specifically, the controller may divide content to be displayed on one screen into three regions upon reception of touch input applied to touchscreens of three electronic devices 100A, 100B and 100C included in the group. The controller may transmit the first region of the divided content to the electronic device 100A through which first touch input has been received, transmit the second region of the divided content to the electronic device 100B through which second touch input has been received and transmit the third region of the divided content to the electronic device 100C through which third touch input has been received on the basis of touch input reception time, and control the electronic devices 100A, 100B and 100C to simultaneously display the received content as one screen.

FIG. 11 is a view for explaining a method for displaying a function key during content playback when a plurality of electronic devices is controlled in landscape by the electronic device according to an embodiment of the present invention.

Referring to FIG. 11, the controller (180 of FIG. 1) may display one or more function keys f1, f2 and f3 on the touchscreens of the plurality of electronic devices upon reception of touch input applied to a touchscreen of a specific electronic device 100B during content playback.

The first function key f1 may be used to execute a play, stop, forward or fast forward or fast reverse function, the second function key f2 may be used to execute a function of adding an electronic device to display content and the third function key f3 may be used to execute a function of resetting content display order.

FIG. 12 is a view for explaining a method for including a new specific electronic device in a group when a plurality of electronic devices included in the group is controlled in landscape by the electronic device according to an embodiment of the present invention.

Referring to FIG. 12, the controller (180 of FIG. 1) may regenerate a group by including a specific electronic device 100D in the corresponding group upon reception of input for selecting the second function key f2 and touch input applied to the touchscreen of the specific electronic device 100D.

The controller may receive drag input applied through the bezel of the touchscreen of the specific electronic device 100D while the second function key f2 is touched when the content is displayed throughout the touchscreens of the three electronic devices 100A, 100B and 100C (refer to FIG. 12(a)).

The controller may regenerate the group to which four electronic devices 100A to 100D belong by including the specific electronic device 100D in the previous group and control the four electronic devices 100A to 100D included in the group to share and simultaneously display the content. That is, the controller can divide the content displayed as one screen into four regions, respectively transmit the four regions to the four electronic devices 100A to 100D and control the four electronic devices 100A to 100D to simultaneously display the regions (refer to FIG. 12(b)).

FIG. 13 is a view for explaining a method for determining order of a plurality of electronic devices during content playback when the electronic devices are controlled in landscape by the electronic device according to an embodiment of the present invention.

Referring to FIG. 13, upon reception of input for selecting the third function key f3 and touch input applied to the touchscreens of the electronic devices 100A to 100D included in the group while the content is displayed, the controller (180 of FIG. 1) may determine segmented content display order on the basis of the received touch input.

When arrangement order of some electronic devices 100B and 100C from among the plurality of electronic devices 100A to 100D is changed and thus the arrangement order of the plurality of electronic devices 100A to 100D does not correspond to content display order, the controller may select the third function key f3 and then re-receive touch input applied to the touchscreens of the plurality of electronic devices 100A to 100D.

The controller may transmit the segmented content in the arrangement order of the plurality of electronic devices 100A to 100D according to the re-received touch input and display the content. The controller may determine that the electronic devices 100A to 100D are arranged in the order of the first, third, second and fourth electronic devices 100A, 100C, 100B and 100D on the basis of touch input reception time. The controller may control the electronic devices to respectively display the first to fourth regions of the segmented content in the arrangement order of the electronic devices. For example, the controller can control the second electronic device 100C through which second touch input is received to display the second region of the segmented content and control the third electronic device 100B through which third touch input is received to display the third region of the segmented content.

FIGS. 14, 15 and 16 are views for explaining a method for displaying event information or device information when a plurality of electronic devices is controlled in landscape by the electronic device according to an embodiment of the present invention.

Referring to FIG. 14, the controller (180 of FIG. 1) may set indicator areas SN1 to SN4 in the touchscreens of the plurality of electronic devices included in the group and manage the indicator areas as one indicator area SN.

The controller may display, in the indicator area SN, device information or event information about a specific electronic device, selected from device information or event information transmitted from the electronic devices included in the group according to a predetermined standard.

The controller may select an electronic device that has transmitted changed event information or an electronic device having device information regarding a maximum or minimum value as the specific electronic device.

Referring to FIG. 15, upon reception of touch input applied to the touchscreen of the specific electronic device 100B, the controller (180 of FIG. 1) may respectively display device information and event information of the electronic devices 100A to 100D in the indicator areas SN1 to SN4.

In this case, the controller may manage the indicator areas SN1 to SN4 of the electronic devices 100A to 100D as one indicator area SN after respectively displaying the device information or event information of the electronic devices 100A to 100D in the indicator areas SN1 to SN4 for a predetermined time.

Referring to FIG. 16, reception of event generation notification from the specific electronic device 100B, the controller (180 of FIG. 1) may display the event generation notification in the indicator area SN.

The controller may display the indicator area SN2 set to the specific electronic device 100B such that display characteristics of the indicator area SN2 is discriminated from those of other indicator areas SN1, SN3 and SN4 (refer to FIG. 16(a)).

The controller may display the event generation notification through a pop-up window W1 on the touchscreen of the specific electronic device 100B (refer to FIG. 16(b)).

FIGS. 17 to 21 are views for explaining information displayed on the notification bar when a plurality of electronic devices is controlled in landscape by the electronic device according to an embodiment of the present invention.

Referring to FIG. 17, the controller (180 of FIG. 1) may set one notification bar for the plurality of electronic devices 100A to 100D included in the group. Upon reception of sliding input applied from one side of the touchscreen of the specific electronic device 100C, the controller may display the notification bar on the touchscreens of the electronic devices 100a to 100D.

The controller may display device information or event information about the electronic devices 100A to 100D on the notification bar and re-set display order of device information or event information displayed on the notification bar according to sliding input position.

Specifically, the controller may display brightness information and volume information about the third electronic device 100C on the notification bar and display event information received from the third electronic device 100C before other event information upon reception of sliding input applied from one side of the touchscreen of the third electronic device 100C (refer to FIG. 17(a)). The controller may display content information I1 to I8 stored in the host electronic device 100A and a function key FROM used to change the host electronic device in the form of floating keys (refer to FIG. 17(b)).

Referring to FIG. 18, the controller (180 of FIG. 1) may synchronize the brightness information about the specific electronic device, displayed on the notification bar, with brightness information about other electronic devices.

The controller may set the brightness information about the third electronic device, displayed on the notification bar, and select icon 'All sync' to synchronize the brightness information of the specific electronic device with brightness information of other electronic devices (refer to FIG. 18(a)).

The controller may transmit a control signal for synchronizing brightness information of other electronic devices with the brightness information of the third electronic device to the other electronic devices in response to received input, change 'brightness of the third electronic device' to 'total brightness' and display the brightness information on the notification bar.

In a similar manner, the controller may set volume information about the third electronic device and synchronize the volume information with volume information about other electronic devices included in the group.

Referring to FIG. 19, the controller (180 of FIG. 1) may select a device information setting menu of the notification bar to individually set device information of the electronic devices included in the group.

Upon reception of a brightness information setting menu, the controller may display function keys through which brightness information of the electronic devices included in the group can be respectively set in the pop-up window W1 and control the function keys to simultaneously set brightness information of the plurality of electronic devices.

Referring to FIG. 20, the controller (180 of FIG. 1) may transmit a control signal for changing the host electronic device to the plurality of electronic devices upon reception of drag input applied to a floating key FI through which the host electronic device can be changed.

Specifically, upon reception of input of dragging the floating key FI to the touchscreen of the third electronic device 100C, the controller may transmit the control signal for changing the host electronic device to the third electronic device 100C to the plurality of electronic devices 100A to 100D.

The controller of the changed host electronic device may change a list of content I1 to I18, stored in the previous host electronic device, that is, the first electronic device 100A and displayed on the notification bar, to a list of content I1' to I18' stored in the third electronic device 100C.

Referring to FIG. 21, upon selection of one of pieces of content in the content list displayed on the notification bar, the controller (180 of FIG. 1) may display brief information about the selected content in the pop-up window W1.

Specifically, upon selection of second content I2 displayed on the notification bar, the controller may display representative scenes S1 to S13 of the second content I2 in the pop-up window W1.

FIGS. 22 and 23 are views for explaining a method for changing an electronic device processing an event when a plurality of electronic devices is controlled in landscape by the electronic device according to an embodiment of the present invention.

Referring to FIGS. 22 and 23, the controller (180 of FIG. 1) may change an electronic device that will processes an event upon reception of drag input applied to the pop-up window W1 in which event generation information is displayed.

The controller may display event generation notification through the pop-up window W1 on the touchscreen of the third electronic device 100C when a call reception event is generated in the third electronic device 100C while content is played in the electronic devices 100A to 100D included in the group (refer to FIG. 22(a)).

Upon reception of drag input applied to the pop-up window W1, the controller may move the pop-up window W1 according to trajectory of the drag input, display the pop-up window W1 and control the fourth electronic device 100D to process the event generated in the third electronic device 100C (refer to FIG. 22(b)).

Upon selection of a call menu through the pop-up window W1 displayed on the touchscreen of the fourth electronic device 100D, the controller may cancel content playback in the fourth electronic device 100D and process the call event through the fourth electronic device 100D. In addition, the controller may re-segment and transmit the corresponding content such that the first, second and third electronic devices 100A, 100B and 100C display the content as one screen.

FIGS. 24, 25 and 26 are views for explaining a method for magnifying content when a plurality of electronic devices is controlled in landscape by the electronic device according to an embodiment of the present invention.

Referring to FIGS. 24, 25 and 26, upon reception of various touch inputs applied to the touchscreens of the plurality of electronic devices 100A to 100D included in the corresponding group, the controller (180 of FIG. 1) may magnify content display on at least one of the touchscreens of the plurality of electronic device such that the content corresponds to each touch input.

Upon reception of specific input through the touchscreen of the specific electronic device 100B included in the group, the controller may magnify only the part of content, displayed on the touchscreen of the specific electronic device 100B, or magnify or reduce content displayed throughout the touchscreens of the electronic devices 100A to 100D on the basis of the region to which the specific input is applied (refer to FIGS. 24, 25 and 26).

The specific input may be input of pinching in or pinching out two or three points in different directions.

The controller may magnify or reduce only parts of the content, displayed on the touchscreens of two electronic devices 100B and 100C, upon reception of specific input through the touchscreens of the two electronic devices 100B and 100C (refer to FIG. 25).

In this case, the specific input may be input of pinching in or pinching out two points on the touchscreen of the electronic device 100B in different directions while one point on the touchscreen of the electronic device 100C is touched.

The controller may set the specific input in various forms so as to magnify or reduce only content displayed on the touchscreen of a specific electronic device.

FIGS. 27 to 44 are views for explaining methods for controlling a plurality of electronic devices in portrait by the electronic device according to an embodiment of the present invention, which corresponds to the methods for controlling the plurality of electronic devices in landscape, shown in FIGS. 9 to 26.

FIGS. 27 and 28 are views for explaining a method for determining order of electronic devices in initial state when the electronic devices are controlled in portrait by the electronic device according to an embodiment of the present invention.

Referring to FIGS. 27 and 28, upon sequential reception of touch inputs applied to the touchscreens of the plurality of electronic devices in the corresponding group, the controller (180 of FIG. 1) may simultaneously display at least part of content on the touchscreens of the electronic devices on the basis of the number of touch inputs and touch input reception time.

When the controller receives continuous touch input applied throughout the touchscreens of the electronic devices which are contiguously arranged in portrait (refer to FIG. 27(*a*)), including bezels of the touchscreens, or receives discontinuous and sequential touch inputs respectively applied to the touchscreens of the electronic devices (refer to FIG. 27(*b*)), the controller may obtain the number of electronic devices and touch input reception time. The controller may segment content to be displayed as one screen into as many pieces as the number of electronic devices and determine electronic devices displaying the segmented content on the basis of the touch input reception time. That is, the controller can obtain arrangement order of electronic devices in portrait according to touch input received through the touchscreens of the electronic devices.

The controller may transmit the segmented content to electronic devices corresponding thereto and control the electronic devices to simultaneously display the segmented content. Specifically, upon reception of touch inputs applied to the touchscreens of three electronic devices 100A, 100B and 100C included in the group, the controller may segment content to be displayed as one screen into three regions. The controller may respectively transmit first, second and third regions of the segmented content to the electronic device 100A to which first touch input applied, the electronic device 100B to which second touch input is applied and the electronic device 100C to which third touch input is applied and control the electronic devices 100A, 100B and 100C to simultaneously output the received regions of the segmented content so as to display the content as one screen.

FIG. 29 is a view for explaining a method for displaying a function key during content playback when a plurality of electronic devices is controlled in portrait by the electronic device according to an embodiment of the present invention.

Referring to FIG. 29, upon reception of touch input applied to the touchscreen of the specific electronic device 100B during content playback, the controller (180 of FIG. 1) may display one or more function keys f1, f2 and f3 throughout the touchscreens of the plurality of electronic devices.

The first function key f1 may be used to execute a play, stop, fast forward or fast reverse function related to content display, the second function key f2 may be used to execute a function of adding an electronic device which will display content and the third function key may be used to execute a function of re-setting content display order.

FIG. 30 is a view for explaining a method for including a new specific electronic device in a group including a plurality of electronic devices when the plurality of electronic devices is controlled in portrait by the electronic device according to an embodiment of the present invention.

Referring to FIG. 30, upon reception of input for selecting the second function key f2 and touch input applied to the touchscreen of a specific electronic device 100D which does not belong to the group, the controller (180 of FIG. 1) may include the specific electronic device 100D in the group to regenerate a group.

The controller may receive drag input passing through the bezel of the touchscreen of the specific electronic device 100D while the second function key f2 is touched during display of the content throughout the touchscreens of the three electronic devices 100A, 100B and 100C (refer to FIG. 30(*a*)).

The controller can include the specific electronic device 100D in the group to regenerate a group including the four electronic devices 100A to 100D and control the electronic devices 100A to 100D included in the group to share and simultaneously display the content. That is, the controller can segment content displayed as one screen into four regions, respectively transmit the regions of the segmented content to the four electronic devices 100A to 100D and control the electronic devices 100A to 100D to simultaneously display the content (refer to FIG. 30(*b*)).

FIG. 31 is a view for explaining a method for determining order of a plurality of electronic devices during output of content when the plurality of electronic devices is controlled in portrait by the electronic device according to an embodiment of the present invention.

Referring to FIG. 31, upon reception of input for selecting the third function key f3 and touch input re-applied to the touchscreens of the electronic devices 100A to 100D included in the group during content playback, the controller (180 of FIG. 1) may determine display order of regions of segmented content according to the re-applied touch input.

When arrangement order of some electronic devices 100B and 100C from among the plurality of electronic devices 100A to 100D is changed and thus arrangement order of the plurality of electronic devices 100A to 100D does not correspond to content display order, the controller may select the third function key f3 and then re-receive touch input applied to the touchscreens of the plurality of electronic devices 100A to 100D during content playback.

The controller may transmit the segmented content to the electronic devices 100A to 100D and control the electronic devices 100A to 100D to display the segmented content in arrangement order of the electronic devices 100A to 100D according to the re-received touch input. The controller may determine that the electronic devices 100A to 100D are sequentially arranged in order of the first electronic device 100A, the third electronic device 100C, the second electronic device 100B and the fourth electronic device 100D according to touch input reception time. The controller may control the electronic devices to respectively display the first to fourth regions of the segmented content according to arrangement order of the electronic devices. For example, the controller can control the second electronic device 100C to which the second touch input is applied to display the second content region and control the third electronic device 100B to which the third touch input is applied to display the third content region.

FIGS. 32 and 33 are views for explaining a method for displaying event information or device information when a plurality of electronic devices is controlled in portrait by the electronic device according to an embodiment of the present invention.

Referring to FIG. 32, the controller (180 of FIG. 1) may set indicator areas SN on the touchscreens of the plurality of electronic devices included in the group and manage the indicator areas SN as one indicator area.

The controller may display, in the indicator area SN, device information or event information about a specific electronic device, selected from device information or event information transmitted from the plurality of electronic devices included in the group according to a predetermined standard.

The controller may select, as the specific electronic device, an electronic device that has transmitted changed event invention or an electronic device having device information corresponding to a maximum or minimum value.

Referring to FIG. 33, upon reception of touch input applied to the touchscreen of the specific electronic device 100B, the controller (180 of FIG. 1) may respectively display device information or event information of the electronic devices 100A to 100D in the indicator areas SN1 to SN4 of the electronic devices 100A to 100D.

In this case, the controller can respectively display the device information or event information of the electronic devices 100A to 100D in the indicator areas SN1 to SN4 of the electronic devices 100A to 100D for a predetermined time and then manage the indicator areas SN1 to SN4 as one indicator area SN.

Referring to FIG. 34, upon reception of event generation notification from the specific electronic device 100B, the controller (180 of FIG. 1) may display the event generation notification in the indicator area SN.

The controller may display a new notification line BR on the touchscreen of the specific electronic device 100B (refer to FIG. 34(*a*)). When a plurality of electronic devices is arranged in portrait and displays content, the controller may indicate reception of new event generation notification from a specific electronic device by displaying the notification line BR in the lower portion of the touchscreen of the specific electronic device.

The controller may display event notification through a pop-up window W1 on the touchscreen of the specific electronic device 100B (refer to FIG. 34(*b*)).

FIGS. 35 to 39 are views for explaining information displayed on a notification bar when a plurality of electronic devices is controlled in portrait by the electronic device according to an embodiment of the present invention.

Referring to FIG. 35, the controller (180 of FIG. 1) may set one notification bar for the plurality of electronic devices 100A to 100D included in the group. Upon reception of sliding input applied from one side of the touchscreen of the top electronic device 100A to one of the notification lines BR1 to BR4 respectively displayed in the lower portions of the touchscreens of electronic devices arranged below the electronic device 100A, the controller may display the notification bar throughout the touchscreens of the plurality of electronic devices 100A to 100D.

The controller may display device information or event information about the electronic devices 100A to 100D on the notification bar and re-configure display order of the device information or event information displayed on the notification bar according to the position of the notification line on which the sliding input is ended.

Specifically, upon reception of sliding input applied from one side of the touchscreen of the electronic device 100A to the third notification line BR3 (refer to FIG. 35(*a*)), the controller may display brightness information and volume information about the third electronic device 100C and display event information received from the third electronic device 100C before other event information.

The controller may display at least one piece of content information I1 to I14 stored in the host electronic device 100A and a function key FROM through which the host electronic device can be changed in the form of floating keys (refer to FIG. 35(*b*)).

Referring to FIG. 36, the controller (180 of FIG. 1) may synchronize the brightness information of the specific electronic device displayed on the notification bar with brightness information of other electronic devices. \

The controller may set brightness information of the third electronic device, displayed on the notification bar, and receive input for selecting icon 'all sync' for synchronizing the brightness information of the third electronic device with brightness information of other electronic devices (refer to FIG. 36(*a*)).

The controller may transmit a control signal for synchronizing the brightness information of the third electronic device with brightness information of other electronic devices to the other electronic devices according to the received input, change 'Third electronic device brightness' to 'Total brightness' and display 'Total brightness' on the notification bar.

The controller may set volume information of the third electronic device and then synchronize the volume information with volume information of other electronic devices.

Referring to FIG. 37, the controller (180 of FIG. 1) may select a device information setting menu of the notification bar and individually set device information of the plurality of electronic devices included in the group.

The controller may display function keys through which brightness information of the plurality of electronic devices included in the group can be set in a pop-up window W1 upon selection of a brightness information setting menu and simultaneously set brightness information of the electronic devices by controlling the function keys.

Referring to FIG. 38, upon reception of drag input applied to a floating key FI through which the host electronic device can be changed, the controller (180 of FIG. 1) may transmit a control signal for changing the host electronic device to the plurality of electronic devices.

Specifically, upon reception of input of dragging the floating key FI to the touchscreen of the third electronic device 100C, the controller can transmit a control signal for changing the host electronic device to the third electronic device 100C to the plurality of electronic devices 100A to 100D.

In addition, the controller of the changed host electronic device may change a list of content I1 to I14, which is stored in the first electronic device 100A corresponding to the previous host electronic device and displayed on the notification bar, to a list of content I1' to I14' stored in the third electronic device 100C.

Referring to FIG. 39, upon selection of content from the content list displayed on the notification bar, the controller (180 of FIG. 1) may display brief information about the selected content in a pop-up window W1.

Specifically, the controller can display representative scenes S1 to S12 of second content I2 displayed on the notification bar in the pop-up window W1 upon selection of the second content I2.

FIGS. 40 and 41 are views for explaining a method for changing an electronic device processing an event when a plurality of electronic devices is controlled in portrait by the electronic device according to an embodiment of the present invention.

Referring to FIGS. 40 and 41, upon reception of drag input applied to a pop-up window W1 in which event generation information is displayed, the controller (180 of FIG. 1) may change an electronic device that will process the corresponding event.

When a call reception event is generated in the third electronic device 100C during content playback in the plurality of electronic devices 100A to 100D, the controller may control the third electronic device 100C to display event generation notification through the pop-up window W1 (refer to FIG. 40(a)).

Upon reception of drag input applied to the pop-up window W1, the controller may move the pop-up window W1 to the fourth electronic device 100D according to trajectory of the drag input and control the fourth electronic device 100D to process the event generate in the third electronic device 100C (refer to FIG. 40(b)).

The controller may cancel playback of content in the fourth electronic device 100D upon selection of a call menu through the pop-up window W1 displayed on the fourth electronic device 100D and process the corresponding call event through the fourth electronic device 100D. In addition, the controller may re-segment and transmit the content such that the content is displayed as one screen throughout the first, second and third electronic devices 100A, 100B and 100C.

FIGS. 42, 43 and 44 are views for explaining a method for magnifying content when a plurality of electronic devices is controlled in portrait by the electronic device according to an embodiment of the present invention.

Referring to FIGS. 43, 43 and 44, upon reception of various touch inputs through the touchscreens of the plurality of electronic devices 100A to 100D included in the group, the controller (180 of FIG. 1) may magnify a content region displayed on at least one touchscreen from among the touchscreens of the plurality of electronic devices according to touch inputs.

Upon reception of specific input through the touchscreen of the specific electronic device 100B included in the group, the controller may magnify only the content region displayed on the touchscreen of the specific electronic device 100B or magnify or reduce the content displayed throughout the touchscreens of the electronic devices 100A to 100D on the basis of a region to which the specific input is applied (refer to FIGS. 42 and 44).

In this case, the specific input may be input of pinching in or pinching out two or three points in different directions.

Upon reception of specific input through the touchscreens of the electronic devices 100B and 100C included in the group, the controller may magnify or reduce only content regions displayed on the touchscreens of the two electronic devices 100B and 100C (refer to FIG. 43).

In this case, the specific input may be input of pinching in or pinching out two points on the touchscreen of the electronic device 100B in different directions while one point on the touchscreen of the electronic device 100C is touched.

The controller may set the specific input in various forms and thus only content region displayed on the touchscreen of a specific electronic device can be magnified or reduced.

According to the present invention, when a plurality of electronic devices is grouped into one group and content is segmented and displayed throughout the touchscreens of the electronic devices, the host electronic device can share not only control signals related to content display but also event information so as to magnify and display content throughout the touchscreens of the plurality of electronic devices.

The above-described method of controlling the electronic device may be written as computer programs and may be implemented in digital microprocessors that execute the programs using a computer readable recording medium.

The method of controlling the electronic device may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD-ROM, DVD-RAM, magnetic tapes, floppy disks, optical data storage devices. The computer readable recording medium may also be distributed over network coupled computer systems so that the computer readable code is stored and executed in a distribution fashion.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The embodiment is applicable to an electronic device including a recording medium to record an application program for simultaneously displaying the content on touchscreens of a plurality of electronic devices, a device to execute an application program, a smart phone, a PDA, and a notebook computer.

The invention claimed is:
1. An electronic device, comprising:
a communication unit;
a touchscreen; and
a controller configured to:
pair the electronic device with at least one other electronic device via the communication unit to form a group of electronic devices,
display parts of content on touchscreens of the group of electronic devices based on a number of touch inputs applied to the touchscreens and reception times of the touch inputs,
in response to a sliding input on a touchscreen of a particular electronic device included in the group of electronic devices, display a notification bar including device information and event information for the group of electronic devices throughout the touchscreens of the group of electronic devices, and
reconfigure information to be displayed on the notification bar according to the particular electronic device to which the sliding input is applied.
2. The electronic device of claim 1, wherein the touch inputs correspond to continuous touch inputs applied throughout the touchscreens of the group of electronic devices including bezel areas of the touchscreens.
3. The electronic device of claim 1, wherein the controller is further configured to:
transmit the parts of the content and information about a time when the parts of the content will be displayed to each electronic device via the communication unit, and
simultaneously display the parts of the content on the touchscreens of the group of electronic devices.
4. The electronic device of claim 1, wherein the controller is further configured to:
set a display direction of the parts of the content, and
display the parts of the content on each electronic device according to the set display direction.
5. The electronic device of claim 1, wherein the controller is further configured to:
in response to a touch input applied to one of the touchscreens of the group of electronic devices during display of the parts of the content, display at least one of a first function key related to display of the content, a second function key for adding a new electronic device to the group of electronic devices and a third function key for re-setting a display order of the parts of the content.
6. The electronic device of claim 5, wherein the controller is further configured to:
in response to an input for selecting the second function key and a touch input applied to a touchscreen of the new electronic device not included in the group, form a new group including the new electronic device and simultaneously display the parts of the content on the electronic devices included in the new group.
7. The electronic device of claim 5, wherein the controller is further configured to:
in response to an input for selecting the third function key and re-reception of touch inputs applied to the touchscreens of the group of electronic devices, re-determine at least part of the content to be displayed on the touchscreen of each electronic device based on the number of re-received touch inputs and reception times of the re-received touch inputs.
8. The electronic device of claim 1, wherein the controller is further configured to:
display a floating key on the notification bar for selecting a host electronic device for controlling the group of electronic devices,
move the floating key along a trajectory of a drag input applied to the floating key, and
change the host electronic device to an electronic device on which the floating key is moved to and displayed.
9. The electronic device of claim 8, wherein the controller is further configured to:
display at least one piece of content information stored in the host electronic device on the notification bar, and
when the host electronic device is changed, change the content information displayed on the notification bar to at least one piece of content information stored in the changed host electronic device.
10. The electronic device of claim 1, wherein the controller is further configured to:
set indicator areas on the touchscreens of the group of electronic devices, and
display device information or event information of a specific electronic device, selected from among device information or event information for the group of electronic devices according to a predetermined standard, throughout the indicator areas.
11. The electronic device of claim 10, wherein the device information includes at least one of brightness information, volume information and battery information, and the event information includes at least one of call reception information, message reception information and notification reception information.
12. The electronic device of claim 10, wherein the controller is further configured to:
in response to a touch input applied to a touchscreen of a corresponding electronic device included in the group of electronic devices, display device information or event information transmitted for the corresponding electronic device in the indicator areas, and
restore the indicator areas to a previous state after a lapse of predetermined time.
13. The electronic device of claim 10, wherein the controller is further configured to:
display event information corresponding to event generation notification, received from a specific electronic device from among the group of electronic devices, throughout the indicator areas set on the touchscreens of the group of electronic devices, and
display the indicator areas such that display characteristics of an indicator area corresponding to the touchscreen of the specific electronic device are discriminated from those of indicator areas corresponding to the touchscreens of other electronic devices included in the group of electronic devices.
14. The electronic device of claim 1, wherein the controller is further configured to:
display event information corresponding to event generation notification, received from a specific electronic device from among the group of electronic devices, through a pop-up window on the touchscreen of the specific electronic device.

15. The electronic device of claim 14, wherein the controller is further configured to:

determine the specific electronic device to process an event corresponding to the event information according to a trajectory of drag input applied to the pop-up window in which the event information is displayed.

16. The electronic device of claim 15, wherein the controller is further configured to:

cancel display of the content on the touchscreen of the determined specific electronic device until processing of the event is finished, and control electronic devices included in the group other than the specific electronic device to simultaneously display the content.

17. A method for controlling an electronic device, comprising:

pairing, via a communication unit, the electronic device with at least one other electronic device to form a group of electronic devices;

displaying, via a controller, parts of content on touchscreens of the group of electronic devices based on a number of touch inputs applied to the touchscreens and reception times of the touch inputs;

in response to a sliding input on a touchscreen of a particular electronic device included in the group of electronic devices, displaying a notification bar including device information and event information for the group of electronic devices throughout the touchscreens of the group of electronic devices; and reconfiguring information to be displayed on the notification bar according to the particular electronic device to which the sliding input is applied.

18. The method of claim 17, further comprising:

transmitting the parts of the content and information about a time when the parts of the content will be displayed to each electronic device via the communication unit; and controlling the plurality of electronic devices included in the group to simultaneously display the parts of the content on the touchscreens of the group of electronic devices.

* * * * *